United States Patent
Hirai et al.

(10) Patent No.: US 12,018,106 B2
(45) Date of Patent: Jun. 25, 2024

(54) FLUOROSULFONYL GROUP-CONTAINING FLUOROPOLYMER AND METHOD FOR PRODUCING SAME, SULFONIC ACID GROUP-CONTAINING FLUOROPOLYMER AND METHOD FOR PRODUCING SAME, SOLID POLYMER ELECTROLYTE MEMBRANE, MEMBRANE ELECTRODE ASSEMBLY, AND SOLID POLYMER FUEL CELL

(71) Applicant: AGC INC., Tokyo (JP)

(72) Inventors: Takeshi Hirai, Tokyo (JP); Susumu Saito, Tokyo (JP); Hiroyuki Watabe, Tokyo (JP)

(73) Assignee: AGC INC., Tokyo (JP)

( * ) Notice: Subject to any disclaimer, the term of this patent is extended or adjusted under 35 U.S.C. 154(b) by 0 days.

(21) Appl. No.: 17/725,459

(22) Filed: Apr. 20, 2022

(65) Prior Publication Data
US 2022/0251264 A1     Aug. 11, 2022

Related U.S. Application Data

(63) Continuation of application No. PCT/JP2020/039549, filed on Oct. 21, 2020.

(30) Foreign Application Priority Data

Oct. 21, 2019 (JP) .................................. 2019-192095

(51) Int. Cl.
*H01M 8/1004* (2016.01)
*C08F 216/14* (2006.01)
(Continued)

(52) U.S. Cl.
CPC .......... *C08F 216/1475* (2020.02); *C08K 3/04* (2013.01); *C08K 3/08* (2013.01);
(Continued)

(58) Field of Classification Search
CPC .. C08F 2/02; C08F 214/262; C08F 216/1475; C08F 4/34; C08F 8/12; C08J 2327/18;
(Continued)

(56) References Cited

U.S. PATENT DOCUMENTS

2014/0141357 A1* 5/2014 Lochhaas ............ H01M 8/1072
521/38
2019/0027769 A1* 1/2019 Dahlke ................ H01M 8/1004
(Continued)

FOREIGN PATENT DOCUMENTS

EP       3153534 A1     4/2017
EP       3521325 A1     8/2019
(Continued)

OTHER PUBLICATIONS

Machine translation JP2013181128A (Year: 2013).*

*Primary Examiner* — Victoria H Lynch
(74) *Attorney, Agent, or Firm* — Element IP, PLC

(57) ABSTRACT

The present invention provides a fluoropolymer containing fluorosulfonyl groups capable of forming a polymer electrolyte membrane with high conductivity and hot water resistance, a method for its production, a fluoropolymer containing acid-form sulfonic acid groups and a method for its production, a polymer electrolyte membrane, a membrane-electrode assembly and a polymer electrolyte fuel cell. The method for producing a fluoropolymer containing fluorosulfonyl groups of the present invention comprises copolymerizing a monomer m1 ($CF_2$=$CFCF_2$-$O$-$Q^1$-$SO_2F$) and TFE in a reactor at a temperature of from 150 to 200° C. in the presence of a radical polymerization initiator, wherein the radical polymerization initiator is continuously or sequentially added into the reactor so that the concentration of the radical polymerization initiator is kept to at most 2.5 mass ppm of the initial feed of the monomer m1 present in the reactor before initiation of the copolymerization
(Continued)

during the copolymerization, and the molar ratio of the total feed of the monomer m1 to the total feed of tetrafluoroethylene is from 1.5 to 20.

19 Claims, 1 Drawing Sheet

(51) Int. Cl.
  *C08K 3/04* (2006.01)
  *C08K 3/08* (2006.01)
  *C08K 3/22* (2006.01)
  *H01M 8/1039* (2016.01)
  *H01M 8/1072* (2016.01)
  *H01M 8/10* (2016.01)

(52) U.S. Cl.
  CPC ............ *C08K 3/22* (2013.01); *H01M 8/1004* (2013.01); *H01M 8/1039* (2013.01); *H01M 8/1072* (2013.01); *C08K 2003/2244* (2013.01); *H01M 2008/1095* (2013.01)

(58) Field of Classification Search
  CPC .............. C08J 5/2237; C08J 5/2293; C08K 2003/2213; C08K 2003/2244; C08K 3/04; C08K 3/08; C08K 3/22; C09D 127/18; H01M 2008/1095; H01M 8/1004; H01M 8/1039; H01M 8/1072
  See application file for complete search history.

(56) References Cited

U.S. PATENT DOCUMENTS

| | | | |
|---|---|---|---|
| 2019/0221874 A1* | 7/2019 | Saito | ........................ H01B 1/06 |
| 2020/0190025 A1 | 6/2020 | Hirai et al. | |

FOREIGN PATENT DOCUMENTS

| | | | | |
|---|---|---|---|---|
| JP | 2010018674 A | 1/2010 | | |
| JP | 2013181128 A | 9/2013 | | |
| JP | 2014135144 A | 7/2014 | | |
| WO | WO-2018061838 A1 * | 4/2018 | .......... | C08F 214/262 |
| WO | WO-2019045064 A1 | 3/2019 | | |

\* cited by examiner

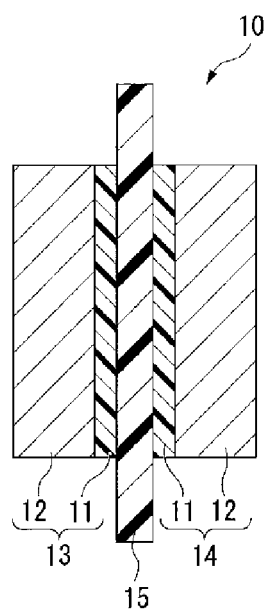

FLUOROSULFONYL GROUP-CONTAINING FLUOROPOLYMER AND METHOD FOR PRODUCING SAME, SULFONIC ACID GROUP-CONTAINING FLUOROPOLYMER AND METHOD FOR PRODUCING SAME, SOLID POLYMER ELECTROLYTE MEMBRANE, MEMBRANE ELECTRODE ASSEMBLY, AND SOLID POLYMER FUEL CELL

TECHNICAL FIELD

The present invention relates to a fluoropolymer containing fluorosulfonyl groups and a method for its production, a fluoropolymer containing acid-form sulfonic acid groups and a method for its production, a polymer electrolyte membrane, a membrane-electrode assembly and a polymer electrolyte fuel cell.

BACKGROUND ART

Polymer electrolyte fuel cells have a structure of, for example, a stack of a plurality of cells, each comprising a membrane/electrode assembly sandwiched between two separators. The membrane/electrode assembly comprises an anode and a cathode each having a catalyst layer, and a polymer electrolyte membrane disposed between the anode and the cathode. The polymer electrolyte membrane is obtainable, for example, by forming a fluoropolymer containing acid-form sulfonic acid groups into a membrane.

Patent Document 1 discloses a method for producing such a polymer having acid-form sulfonic acid groups which comprises copolymerizing tetrafluoroethylene and a monomer represented by $CF_2\!=\!CFCF_2OCF_2CF_2SO_2F$ in the presence of a radical polymerization initiator at a temperature of from 100 to 200° C. and converting $—SO_2F$ groups to sulfonic acid groups by hydrolysis and acidification.

PRIOR ART DOCUMENTS

Patent Documents

Patent Document 1: JP-A-2010-18674

DISCLOSURE OF INVENTION

Technical Problem

In recent years, polymer electrolyte membranes with high conductivity are demanded in order to improve power generation efficiency of polymer electrolyte fuel cells. Because in a polymer electrolyte fuel cell generating electricity, the polymer electrolyte membrane is exposed to high temperature and high humidity, the fluoropolymer having acid-form sulfonic acid groups constituting the polymer electrolyte membrane is required to have hot water resistance.

The present inventors assessed polymer electrolyte membranes made of a fluoropolymer having acid-form sulfonic acid groups obtained by the method disclosed in Patent Document 1 and found that they were insufficient in conductivity and hot water resistance and need some improvement. Specifically speaking, when the ion exchange capacity was raised to obtain polymer electrolyte membranes with conductivities as high as at least 0.08 S/cm, the hot water resistance decreased remarkably, and it turned out that the method disclosed in Patent Document 1 cannot provide a polymer electrolyte membrane with both such a high conductivity as at least 0.08 S/cm and good hot water resistance.

In view of the above-mentioned circumstances, the present invention aims to provide a fluoropolymer containing fluorosulfonyl groups capable of forming a polymer electrolyte membrane with high conductivity and hot water resistance, a method for its production, a fluoropolymer containing acid-form sulfonic acid groups and a method for its production, a polymer electrolyte membrane, a membrane-electrode assembly and a polymer electrolyte fuel cell.

Solution to Problem

As a result of their extensive studies on the above-mentioned problem, the present inventors have found that when a monomer represented by the after-mentioned formula m1 and tetrafluoroethylene are copolymerized in the presence of a radical polymerization initiator (hereinafter referred to as an "initiator") to produce a fluoropolymer containing fluorosulfonyl groups, a fluoropolymer containing fluorosulfonyl groups capable of forming a polymer electrolyte membrane with high conductivity and hot water resistance can be obtained by bringing the copolymerization temperature within a certain range, adding the initiator into the reactor so that during the copolymerization, the concentration of the initiator in the reactor is kept to at most 2.5 mass ppm of the initial feed of the monomer represented by the formula m1 present in the reactor before initiation of the copolymerization, and brining the molar ratio of the total feed of the monomer represented by the formula m1 to the total feed of tetrafluoroethylene within a certain range and have arrived at the present invention.

Namely, the present invention have found it possible to solve the above-mentioned problem by the following constructions.

[1] A method for producing a fluoropolymer containing fluorosulfonyl groups, which comprises copolymerizing a monomer represented by the after-mentioned formula m1 and tetrafluoroethylene in a reactor at a temperature of from 150 to 200° C. in the presence of a radical polymerization initiator to produce the fluoropolymer containing fluorosulfonyl groups, wherein the radical polymerization initiator is continuously or sequentially added into the reactor so that the concentration of the radical polymerization initiator is kept to at most 2.5 mass ppm of the initial feed of the monomer represented by the formula m1 present in the reactor before initiation of the copolymerization during the copolymerization, the molar ratio of the total feed of the monomer represented by the formula m1 to the total feed of tetrafluoroethylene is from 1.5 to 20, and
in the formula m1, $Q^1$ is a single bond or a perfluoroalkylene group which may have an ethereal oxygen atom.

[2] A method for producing a fluoropolymer containing fluorosulfonyl groups, which comprises copolymerizing a monomer represented by the after-mentioned formula m1 and tetrafluoroethylene in a reactor at a temperature of from 150 to 200° C. in the presence of a radical polymerization initiator to produce the fluoropolymer containing fluorosulfonyl groups, wherein the ratio of the total feed of the radical polymerization initiator into the reactor to the total feed of the monomer represented by the formula m1 into the reactor is from 0.01 to 4 mass ppm per 1 hour of copolymerization, the molar ratio of the total feed of the monomer represented by the formula m1 to the total feed of tetrafluoroethylene is from 1.5 to 20, and in the formula m1, $Q^1$ is a single bond or a perfluoroalkylene group which may have an ethereal oxygen atom.

[3] The method for producing a fluoropolymer containing fluorosulfonyl groups according to [1] or [2], wherein the monomer represented by the formula m1 is a monomer represented by the after-mentioned formula m11, and in the formula m11, x is an integer of from 1 to 12.

[4] The method for producing a fluoropolymer containing fluorosulfonyl groups according to any one of [1] to [3], wherein the radical polymerization initiator is a bis(perfluoroalkyl) peroxide or a dialkyl peroxide.

[5] A fluoropolymer containing fluorosulfonyl groups, which comprises units represented by the after-mentioned formula f1 and units based on tetrafluoroethylene, wherein the Q value of the fluoropolymer containing fluorosulfonyl groups is from 0.2 to 60.0 mm$^3$/s, and the ratio of units represented by the formula f1 to all the units constituting the fluoropolymer containing fluorosulfonyl groups is from 21 to 59 mol %, wherein the Q value is the volume (mm$^3$/s) of the fluoropolymer extruded from a cylinder having a cross-sectional area of 1 cm$^2$ at a pressure of 2.94 MPa under a load of 30 kg at 260° C. through a nozzle having an inner diameter of 1 mm and a length of 1 mm during a unit time, and in the formula f1, $Q^1$ is a single bond or a perfluoroalkylene group which may have an ethereal oxygen atom.

[6] The fluoropolymer containing fluorosulfonyl groups according to [5], which converts into a fluoropolymer having acid-form sulfonic acid groups which has an ion exchange capacity of from 1.45 to 2.50 meq/g dry resin when the fluorosulfonyl groups are converted into acid-form sulfonic acid groups.

[7] The fluoropolymer containing fluorosulfonyl groups according to [5] or [6], wherein the units represented by the formula f1 are units represented by the after-mentioned formula f11, wherein in the formula f11, x is an integer of from 1 to 12.

[8] A method for producing a fluoropolymer containing sulfonic acid groups, which comprises converting the fluorosulfonyl groups in a fluoropolymer containing fluorosulfonyl groups produced by the method as defined in any one of [1] to [4] into sulfonic acid groups.

[9] A fluoropolymer containing sulfonic acid groups, which comprises units represented by the after-mentioned formula u1 and units based on tetrafluoroethylene, wherein when the sulfonic acid groups in the fluoropolymer containing sulfonic acid groups are converted into fluorosulfonyl groups, the Q value of the resulting fluoropolymer containing fluorosulfonyl groups is from 0.2 to 60.0 mm$^3$/s, and the ratio of units represented by the formula u1 to all the units constituting the fluoropolymer containing sulfonic acid groups is from 21 to 59 mol %, wherein the Q value is the volume (mm$^3$/s) of the fluoropolymer extruded from a cylinder having a cross-sectional area of 1 cm$^2$ at a pressure of 2.94 MPa under a load of 30 kg at 260° C. through a nozzle having an inner diameter of 1 mm and a length of 1 mm during a unit time, and in the formula u1, $Q^1$ is a single bond or a perfluoroalkylene group which may have an ethereal oxygen atom, and $Z^+$ is $H^+$, a metal ion or an ammonium ion.

[10] The fluoropolymer containing sulfonic acid groups according to [9], wherein the sulfonic acid groups in the fluoropolymer containing sulfonic acid groups are acid-form sulfonic acid groups, and the fluoropolymer containing acid-form sulfonic acid groups has an ion exchange capacity of from 1.45 to 2.50 meq/g dry resin.

[11] The fluoropolymer containing sulfonic acid groups according to [9] or [10], wherein the units represented by the formula u1 are units represented by the after-mentioned formula u11, wherein in the formula u11, x is an integer of from 1 to 12, and $Z^+$ is $H^+$, a metal ion or an ammonium ion.

[12] A liquid composition comprising the fluoropolymer containing sulfonic acid groups as defined in any one of [9] to [11] and a liquid medium.

[13] The liquid composition according to [12], wherein the liquid medium is a mixture of a $C_{1-4}$ alcohol and water.

[14] The liquid composition according to [12] or [13], which further comprises at least one member selected from the group consisting of cerium atoms and manganese atoms.

[15] A polymer electrolyte membrane comprising the fluoropolymer containing sulfonic acid groups as defined in any one of [9] to [11], wherein the sulfonic acid groups in the fluoropolymer containing sulfonic acid groups are acid-form sulfonic acid groups.

[16] The polymer electrolyte membrane according to [15], which further comprises a reinforcing material.

[17] The polymer electrolyte membrane according to [16], wherein the reinforcing material is made of a PTFE porous body.

[18] The polymer electrolyte membrane according to any one of [15] to [17], which has a thickness of from 5 to 200 μm.

[19] The polymer electrolyte membrane according to any one of [15] to [18], which further comprises at least one member selected from the group consisting of cerium atoms and manganese atoms.

[20] A membrane-electrode assembly which comprises an anode having a catalyst layer comprising a catalyst and a polymer having ion exchange groups, a cathode having a catalyst layer comprising a catalyst and a polymer having ion exchange groups, and a polymer electrolyte membrane comprising a polymer having ion exchange groups disposed between the anode and the cathode, wherein at least one of the polymer having ion exchange groups in the anode, the polymer having ion exchange groups in the cathode and the polymer having ion exchange groups in the polymer electrolyte membrane is the fluoropolymer containing sulfonic acid groups as defined in any one of [9] to [11].

[21] The membrane-electrode assembly according to [20], wherein at least one of the polymers having ion exchange groups in the catalyst layers in the anode and the cathode comprises units containing a cyclic ether structure and contains sulfonic acid functional groups, and the polymer having ion exchange groups in the polymer electrolyte membrane is the fluoropolymer containing sulfonic acid groups as defined in any one of [9] to [11].

[22] The membrane-electrode assembly according to [21], wherein the units containing a cyclic ether structure comprise units represented by the after-mentioned formula u12 or units represented by the after-mentioned formula u22, wherein in the formula u12, $R^{21}$ is a $C_{1-6}$ perfluoroalkylene group or a $C_{2-6}$ perfluoroalkylene group having an ethereal oxygen atom between carbon atoms, $R^{22}$ is a fluorine atom, a $C_{1-6}$ perfluoroalkyl group, a $C_{2-6}$ perfluoroalkyl group having an ethereal oxygen atom between carbon atoms or a group represented by $-R^{21}(SO_2X(SO_2R^f)_a)^-M^+$, $M^+$ is a $H^+$, a monovalent metal cation or an ammonium ion which may have at least one hydrocarbon group instead of a hydrogen atom, $R^f$ is a linear or branched perfluoroalkyl group which may have an ethereal oxygen atom, X is an oxygen atom, a nitrogen atom or a carbon atom, and when X is an oxygen atom, a is 0, when X is a nitrogen atom, and a is 1, when X is a carbon atom a is 2, in the formula u22, s is 0 or 1, each of $R^{51}$ and $R^{52}$ is independently a fluorine atom or a $C_{1-5}$ perfluoroalkyl group or may form a spiro ring together with each other (when s is 0), each of $R^{53}$ and $R^{54}$ is independently a fluorine atom or a $C_{1-5}$ perfluoroalkyl group, $R^{55}$ is a fluorine atom, a $C_{1-5}$ perfluoroalkyl group or a $C_{1-5}$ perfluoroalkoxy group.

[23] The membrane-electrode assembly according to any one of [20] to [22], wherein the sulfonic acid groups in the fluoropolymer containing sulfonic acid groups are acid-form sulfonic acid groups.

[24] A polymer electrolyte fuel cell comprising the membrane-electrode assembly as defined in any one of [20] to [23].

Advantageous Effects of Invention

According to the present invention, it is possible to provide a fluoropolymer containing fluorosulfonyl groups capable of forming a polymer electrolyte membrane with high conductivity and hot water resistance, a method for its production, a fluoropolymer containing acid-form sulfonic acid groups and a method for its production, a polymer electrolyte membrane, a membrane-electrode assembly and a polymer electrolyte fuel cell.

BRIEF DESCRIPTION OF DRAWINGS

FIG. 1 A schematic cross-sectional view of an embodiment of the membrane-electrode assembly of the present invention.

DESCRIPTION OF EMBODIMENTS

The following definitions of terms apply throughout the specification and claims unless otherwise noted.

A "salt-form sulfonic acid group" means a sulfonic acid group in the form of a salt (—$SO_3^-M^+$ wherein $M^+$ is a metal ion or an ammonium ion).

An "acid-form sulfonic acid group" means a sulfonic acid group in the acid form (—$SO_3^-H^+$).

A "sulfonic acid group" is a general term for a salt-form sulfonic acid group and an acid-form sulfonic acid group, and a "sulfonic acid group", when used without salt-form or acid-form, means a group represented by —$SO_3Z^+$ (wherein $Z^+$ is $H^+$, a metal ion or an ammonium ion) in the sense of the above-mentioned general term.

A "unit" in a polymer mean an atomic group derived from 1 molecule of a monomer by polymerization. A unit may be an atomic group directly formed by a polymerization reaction, or may be an atomic group having a partially different structure obtained by polymerization followed by partial structural conversion. A unit derived from a certain monomer is sometimes called by the name of the monomer with "unit" added to the end of the name.

A unit represented by the formula u1 is referred to as a unit u1. Units represented by other formulae are also referred to in the same manner.

A monomer represented by the formula m1 is referred to as a monomer m1. Monomers represented by other formulae are also referred to in the same manner.

A numerical range expressed by using "to" includes the figures before and after "to" as the lower limit and the upper limit.

A "total feed of A" means all the amount of A fed into a reactor for polymerization of a polymer, and for example, when A is fed into a reactor before and during polymerization, it means the sum of the amount of A fed into the reactor before the polymerization and the amount of A fed into the reactor during the polymerization. Herein, "A" is a component used for polymerization, such as TFE, monomer m1 or an initiator, which will be described later.

"Productivity index (Rp)" is the amount (g) of a polymer produced per hour by polymerization from 100 g of monomers having $SO_2F$ groups fed before and during copolymerization.

"Copolymerization time" means the duration between initiation of copolymerization and termination of the copolymerization.

"Initiation of copolymerization" is the moment when the coexistence of monomers and an initiator is created at a predetermined pressure in a reactor heated to a predetermined temperature or above, or when a reactor is heated to a predetermined temperature or above after the coexistence of monomers and an initiator is created in the reactor. The predetermined temperature means a temperature not lower than 80° C. and not lower than [(10-hour half-life temperature of the initiator)−30]° C. The predetermined pressure means a pressure at which the partial pressure of tetrafluoroethylene as a monomer is at least 0.02 MPa.

"Termination of copolymerization" is the moment when the content of the reactor is cooled below the predetermined temperature, when tetrafluoroethylene as a monomer is purged, or when a polymerization inhibitor is fed into the reactor. To purge tetrafluoroethylene is to lower the partial pressure of tetrafluoroethylene to 0.01 MPa or below.

When copolymerization is terminated and then resumed by a reversible operation (such as reheating to the predetermined temperature or above, addition of tetrafluoroethylene), the polymerization time after resumption should be counted in.

[Method for Producing Fluoropolymer Containing Fluorosulfonyl Groups According to First Aspect]

The method for producing a fluoropolymer according to the first aspect of the present invention comprises copolymerizing a monomer m1 and tetrafluoroethylene (hereinafter referred to as "TFE") in a reactor at a temperature of from 150 to 200° C. in the presence of an initiator to produce a fluoropolymer containing fluorosulfonyl groups.

During the copolymerization, the initiator is continuously or sequentially into the reactor so that the concentration of the initiator is kept to at most 2.5 mass ppm of the initial feed of the monomer m1 present in the reactor before initiation of the copolymerization.

The molar ratio of the total feed of the monomer m1 to the total feed of TFE is from 1.5 to 20.

Herein, the fluoropolymer containing fluorosulfonyl groups obtained by the method of the first aspect is referred to as a "polymer Fx".

The method can produce a fluoropolymer containing fluorosulfonyl groups capable of forming a polymer electrolyte membrane with high conductivity and hot water resistance.

While the Examples of Patent Document 1 used initiators at rather high concentrations, the present inventors found that polymers with high conductivity and hot water resistance can be obtained by using an initiator at low concentrations.

Namely, it is presumed that keeping the concentration of an initiator to a predetermined level or below during copolymerization of a monomer m1 and TFE inhibits termination reactions, and hence leads to production of a polymer Fx with a higher molecular weight, and the fluoropolymer containing acid-form sulfonic acid groups (hereinafter referred to as a "polymer HAx") obtained by transformation of the fluorosulfonyl groups into acid-form can form a polymer electrolyte membrane with high hot water resistance.

Besides, although decrease in the amount of an initiator usually leads to a lower polymerization speed and lower productivity, in the method of the present invention, the copolymerization proceeded at an industrially acceptable polymerization speed, surprisingly.

Namely, even at a low initiator concentration, by carrying out the copolymerization of the monomer m1 and TFE at a temperature as high as from 150 to 200° C., it is possible to suppress reduction in the polymerization speed during production of a polymer Fx.

When the molar ratio of the total feed of the monomer m1 to the total feed of TFE is from 1.5 to 20, the content of units based on the monomer m1 in the resulting polymer Fx is high, and hence the resulting polymer HAx has a high ion exchange capacity and can form a polymer electrolyte membrane with high conductivity.

Even surprisingly, the polymer turned out to be more chemically durable.

<Monomer m1>

The monomer m1 is a monomer represented by the following formula m1.

$$CF_2=CFCF_2O-Q^1-SO_2F \quad (m1)$$

In the formula m1, $Q^1$ is a single bond or a perfluoroalkylene group which may have an ethereal oxygen atom.

The perfluoroalkylene group may be linear or branched.

The number of carbon atoms in the perfluoroalkylene group is preferably from 1 to 12, more preferably from 1 to 6, particularly preferably from 1 to 4, in view of suppression of reduction in the ion exchange capacity of the polymer HAx and production of a polymer electrolyte membrane with high conductivity.

The number of ethereal oxygen atoms, if any, in the perfluoroalkylene group may be one or at least two, and preferably at most two.

The monomer m1 is preferably a monomer m11, particularly preferably a monomer m11-1 to make it easy to produce a polymer Fx on an industrial scale.

$$CF_2=CFCF_2O(CF_2)_xSO_2F \quad (m11)$$

$$CF_2=CFCF_2OCF_2CF_2SO_2F \quad (m11\text{-}1)$$

In the formula m11, x is an integer of from 1 to 12, preferably an integer of from 1 to 6, particularly preferably an integer of from 1 to 4.

<Additional Monomers>

In the present method, a monomer other than TFE and the monomer m1 (hereinafter referred to as an "additional monomer") may be used.

The additional monomer is preferably a perfluoromonomer, in view of improvement in the chemical durability of the resulting polymer, more preferably a perfluoroallyl ether or a perfluorovinyl ether for introduction into the polymer in a large amount, further preferably a perfluoroallyl ether for easy improvement in the physical properties of the resulting polymer. A perfluorovinyl ether itself can also serve as a chain transfer agent at 150 to 200° C. and hence may be used not only for improvement in physical properties but also for molecular weight control.

Specific examples of additional monomers are given below.

$CF_2=CFCF_2O(CF_2)_{n1}F$,
$CF_2=CF(CF_2)_{n2}F$,
$CF_2=CFCF_2[OCF_2CF(CF_3)]_{n3}OCF_2CF_2CF_3$,
$CF_2=CFO(CF_2)_{n4}CF_3$,
$CF_2=CFOCF_2CF(CF_3)O(CF_2)_{n5}CF_3$,
$CF_2=CF[OCF_2CF(CF_3)]_{n6}O(CF_2)_3F$,

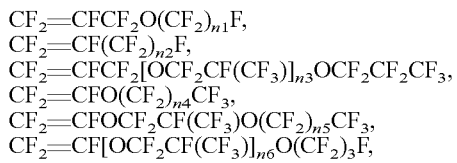

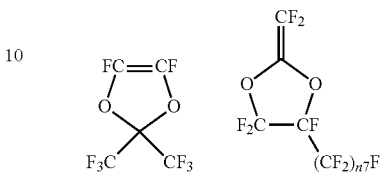

In the above formulae, n1 is an integer of from 1 to 4, n2 is an integer of from 1 to 11, n3 is 1 or 2, n4 is an integer of from 1 to 9, n5 is an integer of from 1 to 9, n6 is 2 or 3, and n7 is an integer of from 1 to 6.

<Initiator>

As the initiator, for example, a bis(fluoroacyl) peroxide, a bis(perfluoroalkyl) peroxide (such as $(CF_3)_3COOC(CF_3)_3$), a bis(chlorofluoroacyl) peroxide, a dialkyl peroxide (such as $(CH_3)_3COOC(CH_3)_3$), a peroxy ester, an azo compound or a persulfate salt may be mentioned. A bis(perfluoroalkyl) peroxide or a dialkyl peroxide is preferred to improve the chemical durability of the resulting polymer electrolyte membrane. Dialkyl peroxides are particularly preferred since they are easily available at low costs and have decomposition temperatures high enough to be polymerized at high temperatures. Among dialkyl peroxides, $(CH_3)_3COOC(CH_3)_3$ is most preferred in view of its lower chain transfer ability.

The initiator may be a single species or a combination of two or more species.

<Copolymerization>

As the mode of copolymerization, bulk polymerization, solution polymerization, suspension polymerization or emulsion polymerization may be specifically mentioned, and bulk polymerization is preferred because it use virtually no polymerization solvent and can avoid production of a polymer Fx having a low molecular weight due to the chain transfer to a polymerization solvent.

In the case of solution polymerization, it is preferred to use a polymerization solvent with a low chain transfer coefficient. As such a polymerization solvent, compounds containing no atoms other than carbon atoms, fluorine atoms, oxygen atoms and nitrogen atoms may be mentioned. Specifically, perfluorotributylamine, perfluorotripropylamine, perfluorohexane, perfluorooctane, perfluorodecane, perfluorododecane, perfluoro(2,7-dimethyloctane), perfluorodecalin, perfluorocyclohexane, perfluoro(1,3-dimethylcyclohexane), perfluoro(1,3,5-trimethylcyclohexane), perfluorodimethylcyclobutane (any structural isomers), perfluoro(2-butyltetrahydrofuran), perfluorobenzene, liquid carbon dioxide and supercritical carbon dioxide may be mentioned.

As a polymerization solvent, a hydrofluorocarbon with few hydrogen atoms, a hydrochlorofluorocarbon with few hydrogen atoms or a hydrofluoroether with few hydrogen atoms may be used.

As specific examples of hydrofluorocarbons with few hydrogen atoms, 1H-perfluorohexane, 1H-perfluorooctane, 1H,4H-perfluorobutane, 2H,3H-perfluoropentane, 3H,4H-perfluoro(2-methylpentane), 1,1,1,3,3-pentafluorobutane and 1,1,2,2,3,3,4-heptafluorocyclopentane may be mentioned.

As a specific example of hydrochlorofluorocarbon with few hydrogen atoms, 1,3-dichloro-1,1,2,2,3-pentafluoropropane may be mentioned.

As specific examples of hydrofluoroether with few hydrogen atoms, $HCF_2CF_2OCH_2CF_3$, $n-C_3F_7OCH_3$, $n-C_3F_7OCHFCF_3$, $n-C_3F_7OCH_2CF_3$, $n-C_4F_9OCH_3$, iso-$C_4F_9OCH_3$, $n-C_4F_9OCH_2CH_3$, $n-C_4F_9OCH_2CF_3$, $CF_3OCF(CF_3)CF_2OCH_3$ and $n-C_3F_7OCF(CF_3)CF_2OCHFCF_3$ may be mentioned.

A chlorofluorocarbon containing no hydrogen atoms may also be used.

The temperature for the copolymerization of the monomer m1 and TFE is from 150 to 200° C. It is preferably at least 155° C., particularly preferably at least 160° C. to speed up the reaction of the monomers, and is preferably at most 190° C., particularly preferably at most 180° C. to retard decomposition of the initiator and control the copolymerization easily.

The polymerization pressure is predetermined according to the copolymerization temperature and the desired ion exchange capacity for the resulting polymer HAx. It is preferably from 0.02 to 1.2 MPa in terms of the partial pressure of TFE to increase the yield of the polymer Fx and the ion exchange capacity of the polymer HAx. The polymerization pressure is preferably from 0.1 to 1.9 MPaG.

In the present method, the monomer m1 is fed into a reactor in advance, and then the copolymerization is initiated.

The initiator may be fed into the reactor together with the monomer m1 before initiation of the copolymerization or may be fed into the reactor containing the monomer m1.

TFE, and additional monomers, if used, may be fed into the reactor together with the monomer m1 before initiation of the copolymerization, or may be fed into the reactor containing the monomer m1, or may be fed into the reactor after initiation of the copolymerization of the monomer m1.

The monomers (TFE and the monomer m1, and additional monomers, if used) and the initiator may be added into the reactor continuously or sequentially.

In the present invention, "adding sequentially" means that something to be added to the polymerization system (such as the monomers and the initiator) is added intermittently in portions by repeating durations of addition and intervals with no addition alternately more than once.

In the present invention, "adding continuously" means that something to be added to the polymerization system (such as the monomers and the initiator) is added without discontinuation for a certain duration and is never added beyond the duration.

The molar ratio of the total feed of the monomer m1 to the total feed of TFE is from 1.5 to 20. It is preferably at least 1.7, more preferably at least 2.0, particularly preferably at least 2.2 in view of production of a polymer HAx with a higher ion exchange capacity and is preferably at most 15, more preferably at most 10, particularly preferably at most 8 in view of production of a polymer electrolyte membrane with high mechanical durability and the yield of the polymer Fx.

The molar ratio of the total feed of additional monomers, if fed into the reactor, to the total feed of TFE or to the total feed of the monomer m1 is preferably from 0.01 to 0.5, particularly preferably from 0.05 to 0.2, to make the effect of the present invention more remarkable.

In the present invention, during copolymerization of the monomer m1 and TFE, the initiator is continuously or sequentially added into the reactor so that the concentration of the radical polymerization initiator is kept to at most 2.5 mass ppm of the initial feed of the monomer m1 present in the reactor before initiation of the copolymerization.

When the concentration of the initiator is kept to at most 2.5 mass ppm, a polymer electrolyte membrane with high hot water resistance is obtained. It was found unexpectedly that the polymer electrolyte membrane also has high chemical durability.

The reason of the high chemical durability is still unclear, but probably because keeping the concentration of the initiator to a low level suppresses introduction of a chemical structure derived from the initiator into a polymer by chain transfer and hence leads to production of a polymer HAx having fewer sites vulnerable to damage.

The concentration of the initiator during the copolymerization is preferably at most 2.5 mass ppm, more preferably at most 2 mass ppm, particularly preferably at most 1.5 mass ppm of the initial feed of the monomer m1 present in the reactor before initiation of the copolymerization for production of a polymer electrolyte membrane with higher hot water resistance and chemical durability.

The concentration of the initiator during the copolymerization is preferably at least 0.01 mass ppm, more preferably at most 0.05 mass ppm, particularly preferably at most 0.1 mass ppm of the initial feed of the monomer m1 present in the reactor before initiation of the copolymerization for smooth polymerization of monomers at high rate.

It is preferred to add the initiator sequentially or continuously in the form of a solution by diluting the initiator with a monomer (such as the monomer m1 or an additional monomer, if used) or a polymerization solvent, in view of quantitative control of the addition and safe copolymerization. It is preferred to dilute the initiator with the monomer m1 in order to avoid production of a polymer Fx having a low molecular weight due to the chain transfer to a polymerization solvent and prevent the polymerization rate from decreasing due to decrease in the concentration of the monomer m1 with progress of the polymerization. The concentration of the initiator in the initiator solution to be added sequentially or continuously is preferably from 10 to 10,000 mass ppm, more preferably from 50 to 3,000 mass ppm, particularly preferably from 100 to 1,000 mass ppm for quantitative control of the addition and safe copolymerization.

According to the kinetics of radical polymerization, thermal decomposition of an initiator approximates a first-order reaction. Therefore, the concentration of an initiator [I] in the reactor at a unit time after initiation of the copolymerization, relative to the initial feed in mass of the monomer m1 present in the reaction before initiation of the copolymerization can be calculated by the following formula.

$$[I] = [I_0] \times \exp(-K_d \cdot t) \qquad \text{formula 1}$$

[I]: the concentration [mass ppm] of the initiator at a unit time after initiation of the copolymerization, relative to the initial feed in mass of the monomer m1 present in the reaction before initiation of the copolymerization

[$I_0$]: the concentration [mass ppm] of the initiator in the reactor at the initiation of the unit time, relative to the initial feed in mass of the monomer m1 present in the reaction before initiation of the copolymerization $K_d$: decomposition rate constant t: unit time Herein, exp means an exponential function.

The initiation of the unit time means, for example, the initiation of the copolymerization or the moment immediately after a sequential addition of the initiator.

$K_d$ in the formula 1 can be calculated by the following formula 2.

$$K_d = A \times \exp(-E_a/RT) \quad \text{formula 2}$$

R: 8.314 [J·K$^{-1}$·mol$^{-1}$]
T: temperature [K]
$E_a$: activation energy [kJ/mol]
A: pre-exponential factor [h$^{-1}$]

$K_d$ is a coefficient defined by the kind of the initiator and the copolymerization temperature. Although A and $E_a$ in the formula 2 for calculation of $K_d$ are known to vary depending on the reaction environment such as the solvent or the concentration of the initiator, herein values obtained by measurements of the thermal decomposition rate on initiator solutions in benzene as a solvent (initiator concentration: 0.10 [mol/L]) were used.

For example, when the initiator is $(CH_3)_3COOC(CH_3)_3$ (hereinafter referred to as "tBPO"), $E_a$ is 155.8 [kJ/mol], A is $2.23 \times 10^{19}$[h$^{-1}$], and the 10-hour half-life temperature is 123.7° C. Then, for copolymerization of a monomer m1 at a copolymerization temperature of 160° C. (T=160+273.15=433.15 [K]) in the presence of tBPO, $K_d$ is given as 3.62 [h$^{-1}$] by assigning these values to the formula 2. Regarding other initiators, for $(CH_3)_3COOC(CH_3)_2$-$C_6H_4$—$C(CH_3)_2OOC(CH_3)_3$, $E_a$ is 166.3 [kJ/mol], A is $9.93 \times 10^{20}$ [h$^{-1}$], and the 10-hour half-life temperature is 119.2° C. For $C_6H_5$—$C(CH_3)_2OOC(CH_3)_2$-$C_6H_5$, $E_a$ is 158.0 [kJ/mol], A is $1.06 \times 10^{20}$[h$^{-1}$], and the 10-hour half-life temperature is 116.4° C. For $CH_3CH_2CH_2C(CH_3)_2OOC(CH_3)_2CH_2CH_2CH_3$, $E_a$ is 154.5 [kJ/mol], A is $3.71 \times 10^{19}$[h$^{-1}$], and the 10-hour half-life temperature is 116.4° C. For $(CH_3)_3COOC(CH_3)_2CH_2CH_2C(CH_3)_2OOC(CH_3)_3$, $E_a$ is 152.0 [kJ/mol], A is $1.39 \times 10^{19}$[h$^{-1}$], and the 10-hour half-life temperature is 117.9° C. For $(CH_3)_3COOC(CH_3)_2C_6H_5$, $E_a$ is 173.1 [kJ/mol], A is $7.59 \times 10^{21}$[h$^{-1}$], and the 10-hour half-life temperature is 119.5° C. For $(CH_3)_3COOC(CH_3)_2C \equiv CC(CH_3)_2OOC(CH_3)_3$, $E_a$ is 151.3 [kJ/mol], A is $3.36 \times 10^{18}$[h$^{-1}$], and the 10-hour half-life temperature is 128.4° C. For $(CF_3)_3COOC(CF_3)_3$ (PFtBPO), $E_a$ is 148.8 [kJ/mol], A is $5.68 \times 10^{19}$[h$^{-1}$], and the 10-hour half-life temperature is 98.5° C.

Next, how to set the amount of an initiator to be added in the case of sequential addition of the initiator will be illustrated.

When a reactor contains 1,000 g of a monomer m1 and 2.0 mass ppm (which corresponds to [$I_0$] in the formula 1) of tBPO as an initiator relative to the monomer m1 before initiation of the copolymerization, it follows that 2 mg of tBPO is present in the reactor at initiation of the copolymerization. Then, after 0.5 hour of copolymerization if the copolymerization is initiated at 160° C. under these conditions, the concentration of tBPO in the reactor becomes 0.327 mass ppm of the initial feed of the monomer m1 present in the reactor before initiation of the copolymerization.

In this case, the concentration of tBPO in the reactor, relative to the initial feed of the monomer m1 present in the reactor before initiation of the copolymerization, can be brought back to the initial level of 2.0 mass ppm at the initiation of the copolymerization, by adding 1.67 mg of tBPO each time. Namely, the concentration of tBPO returns to 2.0 mass ppm every 0.5 hour.

Next, how to set the feed rate [mg/h] of an initiator, or the amount of the initiator to be added per 1 hour, in the case of continuous addition of the initiator will be illustrated.

The rate of decrease in the initiator is given by differentiating the formula 1.

Rate of decrease=$-[I_0] \times K_d$[mass ppm/h]

For example, when copolymerization is carried out at 160° C. in a reactor containing 1,000 g of a monomer m1 and 2.0 mass ppm (which corresponds to [$I_0$] in the formula 1) of tBPO as an initiator relative to the monomer m1 before initiation of the copolymerization, the rate of decrease in the initiator is −7.24 [mass ppm/h], or 7.24 [mg/h] in mass. Namely, the concentration of the initiator, relative to the initial feed of the monomer m1 present in the reactor before initiation of the copolymerization, can be kept to 2.0 mass ppm by continuously adding tBPO at a rate of 7.24 [mg/h].

When an initiator is added sequentially or continuously by setting the amount of the initiator to be added as described above, the concentration of the initiator, relative to the sum of all the monomers, the solvent and the polymer produced in the reactor, decreases as the copolymerization proceeds, because the content of the reactor increases due to the increasing yield of the polymer and the monomer or solvent fed into the reactor together with the initiator as the diluent for the initiator. Still, the effect of the present invention is achieved by adding the initiator continuously or sequentially into the reactor so that the concentration of the initiator in the reactor is kept to at most 2.5 mass ppm of the initial feed of the monomer m1 present in the reactor before initiation of the copolymerization, as defined by the present invention.

The ratio of the total feed of the initiator into the reactor to the total feed of monomer m1 into the reactor is preferably from 0.01 to 4 mass ppm, more preferably from 0.1 to 3 mass ppm, particularly preferably from 0.5 to 2.5 mass ppm, per 1 hour of copolymerization, to make the effect of the present invention more remarkable.

In the method of the present invention, the productivity index (Rp) is preferably at least 0.5, more preferably at least 0.6, particularly preferably at least 0.7, in view of high productivity. The Rp is preferably at most 5.0, more preferably at most 4.0, particularly preferably at most 3.0, for suppression of uneven copolymerization.

After production of a polymer Fx, the polymer Fx may be brought into contact with fluorine gas to fluorinate the instable end groups. This leads to production of a polymer HAx resistant to decomposition from the polymer Fx and production of a polymer electrolyte membrane with higher chemical durability.

The instable end groups are groups formed by chain transfer reactions, groups derived from the initiator and the like, and specific examples are —COOH, —CF=CF$_2$, —COF and —CF$_2$H.

The fluorine gas is preferably diluted with an inert gas (such as nitrogen, helium or carbon dioxide).

The polymer Fx and the fluorine gas are brought into contact preferably at a temperature of from 150 to 200° C., particularly preferably from 170 to 190° C. The contact time between the polymer Fx and the fluorine gas is preferably from 1 minute to 1 week, particularly preferably from 1 to 50 hours.

[Method for Producing Fluoropolymer Containing Fluorosulfonyl Groups According to Second Aspect]

The method for producing a fluoropolymer according to the second aspect of the present invention comprises copolymerizing a monomer m1 and TFE in a reactor at a temperature of from 150 to 200° C. in the presence of an initiator to produce a fluoropolymer containing fluorosulfonyl groups.

The ratio of the total feed of the initiator into the reactor to the total feed of the monomer m1 into the reactor is from 0.01 to 4 mass ppm per 1 hour of copolymerization.

The molar ratio of the total feed of the monomer m1 to the total feed of TFE is from 1.5 to 20.

Herein, the fluoropolymer containing fluorosulfonyl groups obtained by the method of the second aspect is referred to as a "polymer Fy".

The method can produce a fluoropolymer containing fluorosulfonyl groups capable of forming a polymer electrolyte membrane with high conductivity and hot water resistance.

While the Examples of Patent Document 1 used initiators at rather high concentrations, the present inventors found that polymers with high conductivity and hot water resistance can be obtained by using an initiator at low concentrations.

Namely, it is presumed that bringing the ratio of the total feed of the initiator into the reactor to the total feed of the monomer m1 into the reactor within a predetermined range inhibits termination reactions, and hence leads to production of a polymer Fy with a higher molecular weight, and the fluoropolymer containing acid-form sulfonic acid groups (hereinafter referred to as a "polymer HAy") obtained by transformation of the fluorosulfonyl groups into acid-form can form a polymer electrolyte membrane with high hot water resistance.

Besides, although decrease in the amount of an initiator usually leads to a lower polymerization speed and lower productivity, in the method of the present invention, the copolymerization proceeded at an industrially acceptable polymerization speed, surprisingly.

Namely, even at a low initiator concentration, by carrying out the copolymerization of the monomer m1 and TFE at a temperature as high as from 150 to 200° C., it is possible to suppress reduction in the polymerization speed during production of a polymer Fy.

When the molar ratio of the total feed of the monomer m1 to the total feed of TFE is from 1.5 to 20, the content of units based on the monomer m1 in the resulting polymer Fy is high, and hence the resulting polymer HAy has a high ion exchange capacity and can form a polymer electrolyte membrane with high conductivity.

Even surprisingly, the polymer turned out to be more chemically durable.

The method according to the second aspect is different from the method according to the first aspect only in that "the ratio of the total feed of the initiator into the reactor to the total feed of the monomer m1 is from 0.01 to 4 mass ppm per 1 hour of copolymerization", instead of "adding the initiator continuously or sequentially into the reactor so that the concentration of the initiator in the reactor is kept to at most 2.5 mass ppm of the initial feed of the monomer m1 present in the reactor before initiation of the copolymerization".

The components used in the method according to the second aspect and their preferred examples are the same as those in the method according to the first aspect.

The ratio of the total feed of the initiator into the reactor to the total feed of the monomer m1 into the reactor is from 0.01 to 4 mass ppm per 1 hour of copolymerization, and is preferably from 0.1 to 3 mass ppm, particularly preferably from 0.5 to 2.5 mass ppm, to make the effect of the present invention more remarkable.

In the method according to the second aspect, the initiator may be added continuously or sequentially into the reactor so that the concentration of the initiator in the reactor is kept to at most 2.5 mass ppm of the initial feed of the monomer m1 present in the reactor before initiation of the copolymerization, as in the method according to the first aspect, in order to make the effect of the present invention more remarkable.

[Fluoropolymer Containing Fluorosulfonyl Groups]

The polymer Fx and the polymer Fy are preferably fluoropolymers containing fluorosulfonyl groups characterized as follows (hereinafter referred to as "polymer F1"). Hereinafter, the polymer Fx and the polymer Fy are referred to as "polymers F".

The polymer F1 comprises units f1 and TFE units and has a Q value of from 0.2 to 60.0 mm$^3$/second, wherein the ratio of units f1 to all the units constituting the fluoropolymer containing fluorosulfonyl groups is from 21 to 59 mol %.

The fluoropolymer containing acid-form sulfonic acid groups (hereinafter referred to as "polymer HA1") obtained by converting the fluorosulfonyl groups in the polymer F1 to acid-form sulfonic acid groups can form a polymer electrolyte membrane having high conductivity and hot water resistance.

$Q^1$ in the formula f1 is the same as $Q^1$ in the formula m1.

Units f1 are preferably units f11, particularly preferably units f11-1, to make it easy to produce a polymer F1 on an industrial scale.

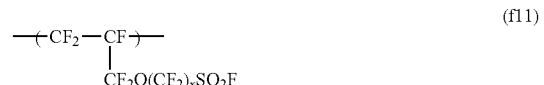

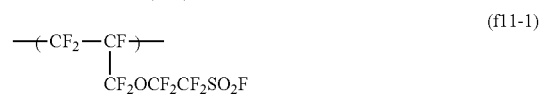

x in the formula f11 is the same as x in the formula m1.

The polymer F1 may comprise units based on the additional monomer (additional monomer units).

The content of TFE units is preferably from 41 to 79 mol %, more preferably from 63 to 78 mol %, particularly from 66 to 76 mol %, relative to all the units constituting the polymer F1. When the ratio is at the lower limit or above, a polymer electrolyte membrane with a lower water uptake and higher mechanical durability results. When the ratio is at the upper limit or below, a polymer electrolyte membrane with high conductivity results.

The content of units f1 is from 21 to 59 mol %, preferably from 22 to 37 mol %, particularly preferably from 24 to 34 mol %, relative to all the units constituting the polymer F1. When the ratio is at the lower limit or above, a polymer electrolyte membrane with high conductivity results. When the ratio is at the upper limit or below, a polymer electrolyte membrane with a lower water uptake and higher mechanical durability results.

The content of additional monomer units, present, in the polymer F1 is preferably from 0.01 to 10 mol %, more preferably from 0.1 to 8 mol %, particularly preferably from 0.5 to 5 mol %, to make the effect of the present invention more remarkable.

The Q value of the polymer F1 is the volume ($mm^3$/second) of the polymer F1 extruded from a cylinder having a cross-sectional area of 1 $cm^2$ at a pressure of 2.94 MPa under a load of 30 kg at 260° C. through a nozzle having an inner diameter of 1 mm and a length of 1 mm during a unit time.

The Q value is a measure similar to MFR (melt flow rate) and correlates with molecular weight. The smaller the Q value of the polymer F1, the higher the molecular weight of the polymer F1, and the larger Q value of the polymer F1, the lower the molecular weight of the polymer F1.

The Q value of the polymer F1 is preferably from 0.2 to 60.0 $mm^3$/second, more preferably from 0.5 to 55 $mm^3$/second, further preferably from 0.8 to 50 $mm^3$/second, particularly preferably from 3.0 to 45 $mm^3$/second. When the Q value of the polymer F1 is within the above-mentioned range, the polymer F1 has a molecular weight high enough to produce a polymer electrolyte membrane with high hot water resistance.

The ion exchange capacity of the polymer HA1 is preferably from 1.45 to 2.50 meq/g, more preferably from 1.50 to 2.00 meq/g, particularly preferably from 1.55 to 1.90 meq/g. When it is at the lower limit or above, the polymer HA1 has a higher conductivity and can form a polymer electrolyte membrane which can achieve a sufficient power output when used in a polymer electrolyte fuel cell. When it is at the upper limit or below, a polymer electrolyte membrane with high mechanical resistance results.

The ion exchange capacity of the polymer HA1 is measured as described later.

[Method for Producing Fluoropolymer Containing Sulfonic Acid Groups]

The method for producing a fluoropolymer containing sulfonic acid groups of the present invention may comprises converting the fluorosulfonyl groups in the polymer F to sulfonic acid groups.

For example, the fluorosulfonyl groups in the polymer F can be converted to sulfonic acid groups by hydrolyzing the fluorosulfonyl groups in the polymer F to salt-form sulfonic acid groups, or by hydrolyzing the fluorosulfonyl groups in the polymer F to salt-form sulfonic acid groups and then acidifying the salt-form sulfonic acid groups to acid-form sulfonic acid groups.

Herein, the fluoropolymer containing sulfonic acid groups obtained by the method is referred to as "polymer H".

By the former, a fluoropolymer containing salt-form sulfonic acid groups (hereinafter referred to as "polymer HB") which is a fluoropolymer H having sulfonic acid groups in the form of a salt is obtained, and by the latter, a fluoropolymer H containing acid-form sulfonic acid groups which is a fluoropolymer H having sulfonic acid groups in the acid form (namely, a polymer HAx or a polymer Hay. Hereinafter, the polymer Hax and the polymer Hay are referred to as "polymers HA" collectively) is obtained.

The polymer H is obtained from the above-mentioned polymer F. Therefore, the polymer H can form a polymer electrolyte membrane having not only high conductivity and hot water resistance and but also high mechanical durability.

The hydrolysis is carried out by bringing the polymer F into contact with a basic compound in a solvent. As the basic compound, sodium hydroxide, potassium hydroxide or trimethylamine may be mentioned specifically. As the solvent, water or a solvent mixture of water and a polar solvent may be mentioned. As the polar solvent, an alcohol (such as methanol or ethanol) or dimethyl sulfoxide may be mentioned specifically.

The acidification is carried out, for example, by bringing the polymer containing salt-form sulfonic acid groups into contact with an aqueous solution of hydrochloric acid, sulfuric acid, nitric acid or the like.

The hydrolysis and the acidification are carried out preferably at a temperature of from 0 to 120° C. It is preferred to wash the polymer with water after the hydrolysis or the acidification.

The polymer H in the form of a salt after hydrolysis or in the acid form after acidification may be immersed in aqueous hydrogen peroxide solution to remove organic substances contained in the polymer H as impurities by decomposition.

The concentration of hydrogen peroxide in the aqueous hydrogen peroxide solution is preferably from 0.1 to 30 mass %, particularly preferably at least 1 mass % and less than 10 mass %. When the concentration of hydrogen peroxide in the aqueous hydrogen peroxide solution is at the lower limit of the above-mentioned range or above, organic substances decompose sufficiently. When the concentration of hydrogen peroxide in the aqueous hydrogen peroxide solution is at the upper limit of the above-mentioned range or below, the polymer H is unlikely to decompose.

The temperature of the aqueous hydrogen peroxide solution is preferably from 15 to 90° C., particularly preferably at least 40° C. and lower than 80° C. When the temperature of the aqueous hydrogen peroxide solution is at the lower limit of the above-mentioned range or above, organic substances decompose sufficiently. When the temperature of the aqueous hydrogen peroxide solution is at the upper limit of the above-mentioned range or below, hydrogen peroxide is unlikely to decompose.

Although the duration of immersion of the polymer H in an aqueous hydrogen peroxide solution varies depending on the thickness of the polymer H and the amount of organic substances in the polymer H, it is preferably from 0.5 to 100 hours when the polymer H is in the form of a membrane having a thickness of 50 μm. When the duration of immersion is 0.5 hour or longer, organic substances even inside the membrane are likely to decompose. It is preferred in view of productivity that the duration of immersion is 100 hours or shorter.

It is preferred to wash the polymer H with water, preferably with ultrapure water, after immersion in the aqueous hydrogen peroxide solution or acidification.

The final form of the polymer H after the above-mentioned treatment may be a powder, pellets or a membrane.

[Fluoropolymer Containing Sulfonic Acid Groups]

The polymer H is preferably a fluoropolymer containing sulfonic acid groups characterized as follows (hereinafter referred to as "polymer H1").

Namely, the polymer H1 comprises units u1 and TFE units, wherein when the sulfonic acid groups in the polymer H1 are converted into fluorosulfonyl groups, the Q value of the resulting fluoropolymer containing fluorosulfonyl groups is from 0.2 to 60.0 $mm^3$/s, and the ratio of units u1 to all the units constituting the polymer H1 is from 21 to 59 mol %.

The polymer H1 may be a fluoropolymer containing acid-form sulfonic acid groups wherein the sulfonic acid groups are in the acid form (namely, the polymer HA1), or a fluoropolymer containing salt-form sulfonic acid groups wherein the sulfonic acid groups are in the form of a salt (hereinafter referred to as "polymer HB1").

The polymer H1 can form a polymer electrolyte membrane which has not only high conductivity and hot water resistance but also high chemical durability.

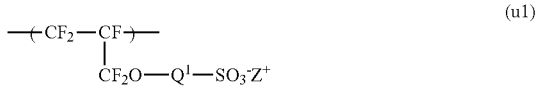

In the formula u1, $Q^1$ is the same as $Q^1$ in the formula m1, $Z^+$ is $H^+$, a metal ion or an ammonium ion. As the metal ion, an alkali metal is preferred.

Units u1 are preferably units u11, particularly preferably units u11-1, to make it easy to produce a polymer H1 on an industrial scale.

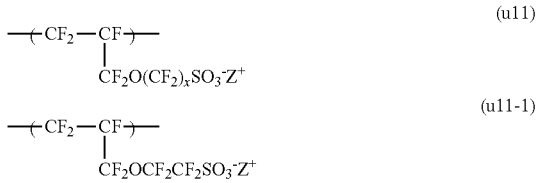

x in the formula u11 is the same as x in the formula m11. $Z^+$ in the formula u11 and the formula u11-1 is the same as $Z^+$ in the formula u1.

The polymer H1 may comprise units based on the additional monomer (additional monomer units).

The content of each species of units is preferably the same as that in the polymer F1.

The definition and preferred modes of the Q value mentioned for the polymer H1 are the same as those for the polymer F1. Specifically speaking, the Q value of the fluoropolymer containing fluorosulfonyl groups obtained by converting the sulfonic acid groups in the polymer H1 to fluorosulfonyl groups should be the same as the Q value of the polymer F1.

The measuring method and preferred modes mentioned for the ion exchange capacity of the polymer H1 are the same as those for the polymer HA1. It should be noted that the fluoropolymer containing acid-form sulfonic acid groups obtained by converting the salt-form sulfonic acid groups in the polymer HB1 is the polymer HA1.

[Polymer Electrolyte Membrane]

The polymer electrolyte membrane of the present invention comprises the polymer HA1.

Because the polymer electrolyte membrane of the present invention comprises the polymer HA1, it has not only high conductivity and hot water resistance but also high chemical durability.

The thickness of the polymer electrolyte membrane is preferably from 5 to 200 µm, particularly preferably from 10 to 130 µm. When the thickness is at the lower limit or above, the membrane has sufficient barrier properties against hydrogen gas. When the thickness is at the upper limit or below, the membrane has a sufficiently low membrane resistance.

The conductivity of the polymer electrolyte membrane is preferably at least 0.08 S/cm, more preferably at least 0.09 S/cm, particularly preferably at least 0.1 S/cm. When the conductivity of the polymer electrolyte membrane is at the above-mentioned value or above, the polymer electrolyte membrane has a sufficiently low membrane resistance and can make a fuel cell which shows excellent power generation performance. Although there is no particular upper limit, the upper limit is usually 0.5 S/cm.

The mass loss of the polymer electrolyte membrane as a measurement of hot water resistance is preferably at most 10%, more preferably at most 7%, particularly preferably at most 6%. When the mass loss is the above-mentioned value or below, dissolution of the membrane into hot water generated during operation of a fuel cell is suppressed sufficiently, the membrane can make a long-life fuel cell with little performance loss.

The polymer electrolyte membrane may further comprise a reinforcing material, such as a porous body, fibers, a woven fabric or a non-woven fabric.

The reinforcing material is preferably made of a material selected from the group consisting of polytetrafluoroethylene (hereinafter referred to as "PTFE"), tetrafluoroethylene-perfluoroalkyl vinyl ether (hereinafter referred to as "PFA"), polyether ether ketone (hereinafter referred to as "PEEK") and polyphenylene sulfide (hereinafter referred to as "PPS"), and is more preferably a PTFE porous body.

The polymer electrolyte membrane may further comprise at least one member selected from the group consisting of cerium atoms and manganese atoms in the form of a metal, a metal compound or a metal ion, to further improve durability. Cerium atoms and manganese atoms are supposed to decompose hydrogen peroxide and hydroxyl radicals, hydroperoxyl radicals responsible for deterioration of polymer electrolyte membranes.

The polymer electrolyte membrane may comprise silica or a heteropoly acid (such as zirconium phosphate, phosphomolybdic acid or phosphotungstic acid) as a humectant. A humectant may be incorporated into the polymer electrolyte membrane, for example by bringing the polymer electrolyte membrane into contact with a solution containing the humectant, or by incorporating the humectant to the after-mentioned liquid composition.

When the polymer electrolyte membrane is produced from the after-mentioned liquid composition by casting as described later, it is preferred to carry out heat treatment after production of the polymer electrolyte membrane to stabilize the polymer electrolyte membrane. The heat treatment temperature is preferably from 130 to 200° C., although it depends on the kind of the polymer HA1. When the heat treatment temperature is 130° C. or above, the water uptake of the polymer HA1 becomes proper. At a heat treatment temperature is 200° C. or below, thermal decomposition of sulfonic acid groups can be suppressed, and the polymer electrolyte membrane suffers no damage to its excellent conductivity.

The polymer electrolyte membrane may be treated with an aqueous hydrogen peroxide solution, if necessary, in the same manner as mentioned above for the polymer H1.

The polymer electrolyte membrane may be produced, for example, by applying a liquid composition containing the polymer HA1 to the surface of a base film or a catalyst layer and drying it (casting).

When the polymer electrolyte membrane comprises a reinforcing material, it may be produced, for example, by impregnating the reinforcing material with a liquid composition containing the polymer HA1 and drying.

[Liquid Composition]

The liquid composition preferably comprises the polymer HA1 and a liquid medium. The polymer HA1 may be dispersed in the liquid medium or dissolved in the liquid medium.

As specific examples of the liquid medium, water and an organic solvent may be mentioned. As the liquid medium, water may be used solely, an organic solvent may be used solely, or a solvent mixture of water and an organic solvent may be used, but it is preferred to use a solvent mixture of water and an organic solvent.

The polymer HA1 tends to disperse or dissolve well in a liquid medium containing water. When the liquid medium contains an organic solvent, an polymer electrolyte membrane resistant to cracking tends to result.

As the organic solvent, an alcohol is preferred for production of an polymer electrolyte membrane resistant to cracking, and $C_{1-4}$ alcohol is more preferred to readily evaporate the organic solvent.

As the $C_{1-4}$ alcohol, for example, methanol, ethanol, 1-propanol, 2-propanol, 1-butanol, 2,2,2-trifluoroethanol, 2,2,3,3,3-pentafluoro-1-propanol, 2,2,3,3-tetrafluoro-1-propanol, 1,1,1,3,3,3-hexafluoro-2-propanol, or 3,3,3-trifluoro-1-propanol may be mentioned.

The organic solvent may be a single species or a combination of two or more species.

When the liquid medium is a solvent mixture of water and an organic solvent, the content of water is preferably from 10 to 99 mass %, particularly preferably from 20 to 99 mass %, relative to the liquid medium.

When the liquid medium is a solvent mixture of water and an organic solvent, the content of the organic solvent is preferably from 1 to 90 mass %, particularly preferably from 1 to 80 mass %.

When the contents of water and the organic solvent are within the above-mentioned range, the polymer HA1 tends to disperse or dissolve well in the liquid medium, and a polymer electrolyte membrane resistant to cracking tends to result.

The content of the polymer HA1 is preferably from 1 to 50 mass %, particularly preferably from 3 to 30 mass %, relative to the liquid composition. When it is at the above-mentioned lower limit or above, a thick membrane can be stably obtained at the time of formation of a membrane. When it is at the above-mentioned upper limit or below, the liquid composition has a proper viscosity.

The liquid composition is obtained by mixing the polymer H1 and a liquid medium. Mixing may be done, for example, applying a shearing force to the polymer H1 in the liquid medium at atmospheric pressure or in a sealed autoclave, for example, by stirring.

The stirring temperature is preferably from 0 to 250° C., more preferably from 20 to 150° C. The shearing force may be applied by sonication, if necessary.

The liquid composition may comprise at least one member selected from the group consisting of cerium atoms and manganese atoms in the form of a metal, a metal compound or a metal ion for formation of a more durable polymer electrolyte membrane from the liquid composition.

[Membrane-Electrode Assembly]

The membrane-electrode assembly of the present invention comprises an anode having a catalyst layer comprising a catalyst and a polymer having ion exchange groups, a cathode having a catalyst layer comprising a catalyst and a polymer having ion exchange groups, and a polymer electrolyte membrane comprising a polymer having ion exchange groups disposed between the anode and the cathode.

Hereinafter, an example of the membrane electrode assembly of the present invention will be described by reference to the drawing.

FIG. 1 is a schematic cross-sectional view of an example of the membrane electrode assembly of the present invention. The membrane electrode assembly 10 comprises an anode 13 having a catalyst layer 11 and a gas diffusion layer 12, a cathode 14 having a catalyst layer 11 and a gas diffusion layer 12, and a polymer electrolyte membrane 15 disposed between the anode 13 and the cathode 14, in contact with the catalyst layers 11.

As specific examples of the catalyst in the catalyst layer 11, a supported catalyst having platinum, a platinum alloy or a platinum-based core-shell catalyst supported on a carbon or metal oxide carrier, an iridium oxide catalyst, an iridium oxide alloy-based catalyst and an iridium oxide-based core-shell catalyst may be mentioned. As the carbon carrier, carbon black powder may be mentioned. As the metal oxide carrier, an single oxide or multiple oxide of metal(s) such as aluminum, tin, zinc, nickel, cobalt, iron, titanium, cerium, zirconium, palladium, lanthanum, niobium, tantalum and antimony may be mentioned. An electrocatalytically active non-metal catalyst such as carbon alloy catalysts may also be used.

As the polymer having ion exchange groups in the catalyst layer 11, a fluoropolymer having ion exchange groups may be mentioned, and it is also preferred to use the polymer HA1.

When the polymer HA1 is used as the polymer having ion exchange groups in the catalyst layer 11, at least one of the polymer having ion exchange groups in the anode catalyst layer and the polymer having ion exchange groups in the cathode catalyst layer is the polymer HA1.

The preferred range of the ion exchange capacity of the polymer HA1 is the same as mentioned previously. When it is at the lower limit or above, the polymer HA1 has high conductivity and can make a catalyst layer which enables high power output. When it is at the upper limit or below, use of the polymer HA1 in a catalyst layer can prevent of flooding during power generation.

The preferred range of the Q value of the polymer F1 which is the precursor of the polymer HA1 is also the same as mentioned previously. When the Q value of the polymer F1 is within the above-mentioned range, the polymer F1 has a sufficiently high molecular weight and can make a catalyst layer with high hot water resistance which is unlikely to dissolve in hot water generated during power generation, and thereby extraction of the polymer outside the system and accompanying gradual loss in power generation performance can be presented.

As the polymer having ion exchange groups in the catalyst layer 11, a polymer comprising units containing a cyclic ether structure and containing sulfonic acid functional groups may be used preferably.

The unis containing a cyclic ether structure preferably comprise at least one species of units selected from the group consisting of units u11, units u12, units u13, units u22 and units u24, preferably units u12 and units u22, particularly preferably units u22.

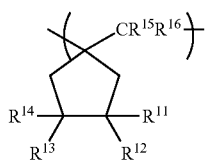  (u11)

Each of $R^{11}$ and $R^{14}$ is independently a monovalent perfluoro organic group which may have an ethereal oxygen atom, a fluorine atom or a group represented b-$R^{17}SO_2X$ $(SO_2R^f)_a^-M^+$.

The monovalent perfluoro organic group is preferably a perfluoroalkyl group. The number of ethereal oxygen atoms, if any, in the perfluoroalkyl group may be one or at least two. Such an oxygen atom may be inserted between carbon atoms in the perfluoroalkyl group or may be bonded to a terminal carbon atom. The perfluoroalkyl group may be linear or branched, and is preferably linear.

$R^{17}$ is a bivalent perfluoro organic group which may have an ethereal oxygen atom. The organic group comprises at least one carbon atom. The bivalent perfluoro organic group is preferably a perfluoroalkylene group. The number of ethereal oxygen atoms, if any, in the perfluoroalkylene group may be one or at least two. Such an oxygen atom may be inserted between carbon atoms in the perfluoroalkylene group or may be bonded to a terminal carbon atom. The perfluoroalkylene group may be linear or branched, preferably linear.

$M^+$ is $H^+$, a monovalent metal cation (such as a potassium ion or a sodium ion), or an ammonium ion which may have at least one hydrocarbon group (such as a methyl group or an ethyl group) instead of a hydrogen atom, preferably $H^+$ in view of high conductivity.

$R^f$ is a linear or branched perfluoroalkyl group which may have an ethereal oxygen atom. The number of carbon atoms in the perfluoroalkyl group is preferably from 1 to 8, particularly preferably from 1 to 6. When a plurality of $R^f$'s are present, they may be identical to or different from one another.

X is an oxygen atom, a nitrogen atom or a carbon atom, and when X is an oxygen atom, a is 0, when X is a nitrogen atom, and a is 1, when X is a carbon atom a is 2. As specific examples of the $-(SO_2X(SO_2R^f)_a)^-M^+$ group, a sulfonic acid group ($-SO_3^-M^+$ group), a sulfonimide group ($-SO_2N$ $(SO_2R^f)^-M^+$ group) or a sulfonemethide group ($-SO_2C$ $(SO_2R^f)_2)^-M^+$ group) may be mentioned.

Each of $R^{12}$, $R^{13}$, $R^{15}$ and $R^{16}$ is independently a monovalent perfluoro organic group which may have an ethereal oxygen atom or a fluorine atom. The monovalent perfluoro organic group is preferably a perfluoroalkyl group. It is preferred that at least one of $R^{15}$ and $R^{16}$ is a fluorine atom in view of high polymerizability, and it is particularly preferred that $R^{15}$ and $R^{16}$ are both fluorine atoms.

When the formula u11 contains two $R^{17}$'s, they may be identical to or different from each other.

Units u11 are preferably units u11-1 or units u11-2.

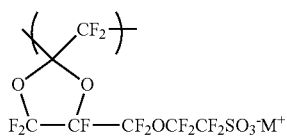  (u11-1)

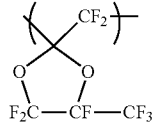  (u11-2)

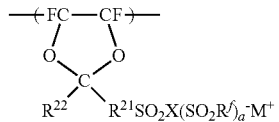  (u12)

In the formula u12, $R^{21}$ is a $C_{1-6}$ perfluoroalkylene group or a $C_{2-6}$ perfluoroalkylene group having an ethereal oxygen atom between carbon atoms. The number of ethereal oxygen atoms, if any, in the perfluoroalkylene group may be one or at least two. The perfluoroalkylene groups may be linear or branched, and is preferably linear.

$R^{22}$ is a fluorine atom, a $C_{1-6}$ perfluoroalkyl group, a $C_{2-6}$ perfluoroalkyl group having an ethereal oxygen atom between carbon atoms or a group represented by $-R^{21}$ $(SO_2X(SO_2R^f)_a)^-M^+$. The number of ethereal oxygen atoms, if any, in the perfluoroalkyl group may be one or at least two. The perfluoroalkyl group may be linear or branched, and is preferably linear. When the formula u12 contains two $R^{21}$'s, they may be identical to or different from each other.

$M^+$, $R^f$, X and a are the same as $M^+$, $R^f$, X and a in the formula u11, respectively.

As specific examples of units u12, units u12-1 and units u12-2 may be mentioned. In the formulae, $M^+$ is the same as $M^+$ in the formula u11.

  (u12-1)

  (u12-2)

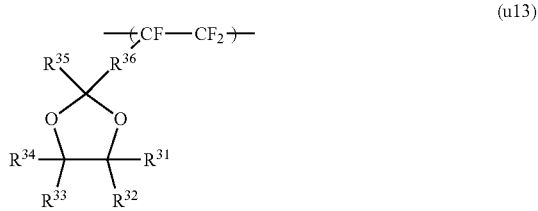  (u13)

In the formula u13, $R^{31}$ is a fluorine atom, a $C_{1-6}$ perfluoroalkyl group, a $C_{2-6}$ perfluoroalkyl group having an ethereal oxygen atom between carbon atoms or a group represented by $-R^{37}SO_2X(SO_2R^f)_a^-M^+$.

The number of ethereal oxygen atoms, if any, in the perfluoroalkyl group may be one or at least two. The perfluoroalkyl groups may be linear or branched, and is preferably linear.

$R^{37}$ is a $C_{1-6}$ perfluoroalkylene group or a $C_{2-6}$ perfluoroalkylene group having an ethereal oxygen atom between carbon atoms. The number of ethereal oxygen atoms, if any, in the perfluoroalkylene group may be one or at least two. The perfluoroalkylene groups may be linear or branched, and is preferably linear.

Each of $R^{32}$ to $R^{35}$ is independently a fluorine atom, a $C_{1-6}$ perfluoroalkyl group or a $C_{2-6}$ perfluoroalkyl group having an ethereal oxygen atom between carbon atoms. The number of ethereal oxygen atoms, if any, in the perfluoroalkyl group may be one or at least two. The perfluoroalkyl groups may be linear or branched, and is preferably linear.

$R^{36}$ is a single bond, a $C_{1-6}$ perfluoroalkylene group or a $C_{2-6}$ perfluoroalkylene group having an ethereal oxygen atom between carbon atoms. The number of ethereal oxygen atoms, if any, in the perfluoroalkylene group may be one or at least two. The perfluoroalkylene groups may be linear or branched, and is preferably linear.

$M^+$, $R^f$, X and a are the same as $M^+$, $R^f$, X and a in the formula u11, respectively.

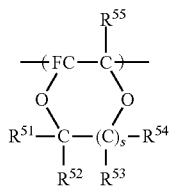
(u22)

In the formula u22, s is 0 or 1 and is preferably 0.

Each of $R^{51}$ and $R^{52}$ is independently a fluorine atom or a $C_{1-5}$ perfluoroalkyl group or may form a spiro ring together with each other (when s is 0).

Each of $R^{53}$ and $R^{54}$ is independently a fluorine atom or a $C_{1-5}$ perfluoroalkyl group.

$R^{55}$ is a fluorine atom, a $C_{1-5}$ perfluoroalkyl group or a $C_{1-5}$ perfluoroalkoxy group. $R^{55}$ is preferably a fluorine atom for high polymerizability.

The perfluoroalkyl group and the perfluoroalkoxy group may be linear or branched, and are preferably linear.

Units u22 are preferably units u22-1.

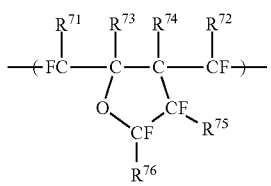
(u22-1)

(u24)

In the formula u24, each of $R^{71}$ to $R^{76}$ is independently a monovalent perfluoro organic group which may have an ethereal oxygen atom or a fluorine atom. The monovalent perfluoro organic group is preferably a perfluoroalkyl group. The number of ethereal oxygen atoms, if any, in the perfluoroalkyl group may be one or at least two. Such an oxygen atom may be inserted between carbon atoms in the perfluoroalkyl group or may be bonded to a terminal carbon atom. The perfluoroalkyl group may be linear or branched, and is preferably linear.

$R^{71}$ to $R^{74}$ are preferably fluorine atoms for high polymerizability.

The content of units containing a cyclic ether structure is at least 30 mol %, more preferably at least 40 mol %, further preferably at least 50 mol %, particularly preferably at least 70%, relative to all the units constituting the polymer comprising units containing a cyclic ether structure and containing sulfonic acid functional groups, in view of the power generation efficiency of a fuel cell.

The upper limit of the content of units containing a cyclic ether structure is 100 mol %, particularly preferably 80 mol %, relative to all the units constituting the polymer comprising units containing a cyclic ether structure and containing sulfonic acid functional groups.

The polymer comprising units containing a cyclic ether structure and containing sulfonic acid functional groups may comprise only one species of units containing a cyclic ether structure or two or more species of units containing a cyclic ether structure. In the latter case, the content of such units means the total content of these species.

The gas diffusion layers 12 have a function to uniformly diffuse gas through the catalyst layers and a function as current collectors. The gas diffusion layers 12 may, for example, be carbon paper, carbon cloth, carbon felt or porous titanium (such as sintered product of titanium particles or fibers). The gas diffusion layers 12 may have a water-repellent or hydrophilic finish of PTFE or the like or a hydrophilic finish of a polymer ion exchange groups, to prevent adhesion of generated gases.

Although the membrane-electrode assembly shown in FIG. 1 comprises gas diffusion layers 12, gas diffusion layers are optional, and hence the membrane-electrode assembly may comprise no gas diffusion layers The polymer having ion exchange groups in the polymer electrolyte membrane 15 is preferably the polymer HA1. Namely, the polymer electrolyte membrane 15 is preferably the polymer electrolyte membrane of the present invention.

The anode 13 and the cathode 4 may comprise additional parts other than those described above.

Such additional parts include, for example, carbon layers (not shown) disposed between the catalyst layers 11 and the gas diffusion layers 12. Carbon layers facilitate diffusion of gas the surfaces of the catalyst layers 11 and substantially improve the power generation performance of the fuel cell.

The carbon layers contain, for example, carbon and a nonionic fluoropolymer. A preferred example of the carbon is a carbon nanofiber having a diameter of from 1 to 1,000 nm and a fiber length of at most 1,000 μm. The nonionic fluoropolymer may, for example, be polytetrafluoroethylene.

The membrane-electrode assembly may be produced, for example, by forming catalyst layers on a polymer electrolyte membrane and sandwiching the resulting assembly between gas diffusion layers, or by forming catalyst layers on gas diffusion layers to form electrodes (an anode and a cathode) and sandwiching a polymer electrolyte membrane between the electrodes.

The catalyst layers may be formed by applying a catalyst layer coating liquid to the surface to be coated, followed by drying, if necessary. The catalyst layer coating liquid is a dispersion of a polymer having ion exchange groups in a dispersion medium. The catalyst layer coating liquid may be prepared, for example, by mixing a liquid composition comprising a polymer having ion exchange groups and a dispersion of the catalyst. The catalyst layer coating liquid may contain at least one member selected from cerium and manganese in the form of a metal, a metal oxide or a metal ion.

[Polymer Electrolyte Fuel Cell]

The polymer electrolyte fuel cell of the present invention comprises the above-mentioned membrane-electrode assembly.

The polymer electrolyte fuel cell of the present invention shows good power generation performance and durability.

The polymer electrolyte fuel cell of the present invention may comprises separators having channels as gas flow paths on both sides of the membrane-electrode assembly.

The separator may be made of various electrically conductive material, such as a metal, carbon or a graphite-resin composite.

In the polymer electrolyte fuel cell, an oxygen-containing gas is supplied to the cathode, and a hydrogen-containing gas is supplied to the anode to generate electricity.

Further, the membrane-electrode assembly can be applied also to a methanol fuel cell which generates electricity from methanol supplied to the anode.

EXAMPLES

Now, the present invention will be described in further detail with reference to Examples. Examples 1-1 to 1-6, Examples 2-1 to 2-6, Examples 3-1 to 3-6, Examples 4-1 to 4-6, Example 5-1, Examples 6-1 to 6-3 and Examples 8-2 to 8-10 are working Examples, while examples 1-7 to 1-11, Examples 2-7 to 2-11, examples 3-7 to 3-11, Examples 4-7, to 4-11, Example 5-2, Example 6-4, Example 8-1 and Example 8-11 are comparative Examples. The fluoropolymers containing sulfonic acid groups in the working Examples are referred to as "polymers H", while the fluoropolymers containing sulfonic acid groups in the comparative Examples are referred to as "polymers H'". The fluoropolymers containing fluorosulfonyl groups in the working Examples are referred to as "polymers F", while the fluoropolymers containing fluorosulfonyl groups in the comparative Examples are referred to as "polymers F'". It should be understood that the present invention is by no means restricted thereto. The amounts of the respective components in Tables give later are based on mass, unless otherwise noted.

[Ion Exchange Capacity]

A fluoropolymer containing acid-form sulfonic acid groups was dried under vacuum at 120° C. for 12 hours and then soaked in a 0.85 mol/g sodium hydroxide solution (solvent: water/methanol=10/90 (mass ratio)) to neutralize the ion exchange groups. The ion exchange capacity of the fluoropolymer containing acid-form sulfonic acid groups was determined by back titration of the sodium hydroxide solution left after the neutralization with 0.1 mol/L hydrochloric acid.

[Ratios of Respective Units]

The ratios of respective species of units in fluoropolymers containing fluorosulfonyl groups, such as TFE units and PSAE units, were determined by $^{19}$F-NMR of the polymers.

$^{19}$F-NMR measurements were made at 282.7 MHz, using hexafluorobenzene as the solvent and $CFCl_3$ as the chemical shift standard.

The ratios of respective species of units in fluoropolymers containing sulfonic acid groups were the same as those in the corresponding fluoropolymers containing fluorosulfonyl groups.

[Q value and TQ value]

By means of a flow tester (capillary rheometer flowtester, CFT-500D manufactured by Shimadzu Corporation) equipped with a nozzle having an inner diameter of 1 mm and a length of 1 mm, a polymer F or a polymer F' packed in a cylinder having a cross-sectional area of 1 $cm^2$ was extruded at a pressure of 2.94 MPa under a load of 30 kg at 260° C. through the nozzle, and the Q value of the polymer was defined as the volume flow rate ($mm^3$/second) of the polymer during extrusion at a constant speed. The smaller the Q value of a polymer, the higher the molecular weight of the polymer, and the larger Q value of the polymer, the lower the molecular weight of the polymer.

TQ value is defined as the temperature at which Q value is 100 $mm^3$/second.

[Conductivity]

The resistivity of a polymer electrolyte membrane was measured by the conventional 4-point probe method at a constant temperature of 80° C. at a constant relative humidity of 50% by bringing a 5-mm wide strip of the membrane (thickness 25 μm) into contact with a board with four electrodes spaced 5 mm from each other and applying an alternate current at 10 kHz at a voltage of 1V, and the conductivity was calculated. For calculation, the dimensions and thickness of the membrane at a temperature of 23° C. and a relative humidity of 50 RH % were used for calculation.

[Water Uptake]

A polymer electrolyte membrane (thickness 25 μm) was soaked in warm water at 80° C. for 16 hours, and then the water was allowed to cool to 25° C. or below. Then, the membrane was drawn out of the water and dried with filter paper, the mass W1 of the membrane was measured. The hydrated membrane was dried in a glove box at room temperature (about 15 to 25° C.) for at least 40 hours while flushing with dry nitrogen gas (dew point −70° C. or below), and the mass of the membrane W2 was measured in the glove box. The water uptake was calculated by the following formula.

Water uptake=$\{(W1-W2)/W2\}\times 100$

[Hot Water Resistance]

A polymer electrolyte membrane (thickness 25 μm) was dried in a glove box at room temperature (about 15 to 25° C.) for at least 40 hours while flushing with dry nitrogen gas (dew point −70° C. or below), and the mass of the membrane (W1) was measured in the glove box. The membrane and ultrapure water enough to immerse the membrane were put into a 120 mL pressure container, and the pressure container was put in an oven heated at 120° C. After 24 hours of heating, the pressure container was cooled with water, and the membrane was taken out of the pressure container and dried with filter paper (ADVANTEC No. 2). The hydrated membrane was dried in a glove box at room temperature (about 15 to 25° C.) for at least 40 hours while flushing with dry nitrogen gas (dew point −70° C. or below), and the mass of the membrane (W2) was measured in the glove box. The mass loss (mass %) was calculated by the following formula.

Mass loss=$\{(W1-W2)/W1\}\times 100$

[Chemical Durability]

A polymer electrolyte membrane was assembled into a membrane-electrode assembly, and the membrane-electrode assembly was mounted in a power generation cell. As an accelerated test, the open circuit voltage test (OCV test) described blow was conducted.

Hydrogen (utilization rate 50%) and air (utilization rate 50%) equivalent to a current density of 0.2 A/$cm^2$ were supplied to the anode and the cathode, respectively, at an ordinary pressure, and the cell was operated under open circuit conditions without power generation at a cell temperature of 90° C., at an anode gas dew point temperature of 61° C. and a cathode gas dew point temperature of 61° C. The outlet gases were led into 0.1 mol/L aqueous potassium hydroxide for 24 hours to collect the fluoride ions in the outlet gases, and the fluoride ion concentration was determined by ion chromatography to calculate the cumulative fluoride emission.

The durability of the membrane was rated on the basis of the cumulative fluoride emission during 200 hours of the open circuit voltage test divided by the surface area of the electrodes, on the following scale.

◯: cumulative fluoride emission was at most 150 μg/cm$^2$

Δ: cumulative fluoride emission was higher than 150 μg/cm$^2$ and at most 300 μg/cm$^2$ x: cumulative fluoride emission was higher than 300 μg/cm$^2$

[Power Generation Characteristics]

A membrane-electrode assembly was mounted in a power generation cell, and hydrogen gas (utilization rate 70%) and air (utilization rate 50%) were fed to the anode and the cathode, respectively, at a pressure of 151 kPa (absolute pressure), while the electrode-membrane assembly was kept at a temperature of 95° C. The cell voltage at hydrogen and air humidities of 20% RH at a current density of 2 A/cm$^2$ was recorded. The higher the cell voltage, the better the power generation characteristics of the polymer electrolyte membrane fuel cell.

[Swelling-Dehydration Cycle Durability (Dry/Wet Cycle Durability)]

A swelling-dehydration cycle test was conducted in accordance with Yeh-Hung Lai, Cortney K. Mittelsteadt, Craig S. Gittleman, David A. Dillard, "VISCOELASTIC STRESS MODEL AND MECHANICAL CHARACTERIZATION OF PERFLUOROSULFONIC ACID (PFSA) POLYMER ELECTROLYTE MEMBRANES", Proceedings of FUEL CELL 2005, Third International Conference on Fuel Cell Science, Engineering and Technology, FUEL CELL 2005, (2005), 74120, as described below.

A membrane-electrode assemble obtained in each Example was mounted in a power generation cell (electrode surface area 25 cm$^2$), and nitrogen gas was suppled at 1 L/min to the anode and the cathode at a cell temperature of 80° C. A cycle of supplying nitrogen gas with a humidity of 150% RH for 2 minutes and supplying nitrogen gas with a humidity of 0% RH for 2 minutes were repeated. After every 1,000 cycles, the supply of nitrogen gas was stopped, and hydrogen was pressured into the anode side to generate a pressure difference between the anode and cathode sides. The hydrogen leak across the membrane-electrode assembly from the anode side to the cathode side was measured. The number of cycles was counted until the hydrogen crossover, or the hydrogen leak per unit time per unit surface area, increased 5-fold from its initial value. The greater the number of cycles, the higher the durability of the polymer electrolyte fuel cell to swelling-dehydration cycles.

Abbreviations

The following abbreviations are used for monomers, initiators and solvents.
TFE: tetrafluoroethylene
PSAE: $CF_2=CFCF_2OCF_2CF_2SO_2F$
tBPO: $(CH_3)_3COOC(CH_3)_3$
PFtBPO: $(CF_3)_3COOC(CF_3)_3$
HFE-347pc-f: $CF_3CH_2OCF_2CF_2H$
HFC-52-13p: $CF_3(CF_2)_5H$

[Production of Polymers F and Polymers F']

Polymers F-1 to F-4 and polymers F'-1 to F'-5 were produced as follows.

Example 1-1

525.0 g of PSAE (monomer) was put into an autoclave (hereinafter referred to as A/C, inner volume 500 mL, made of hastelloy) equipped with an air condenser and cooled with liquid nitrogen and degassed. After introduction of nitrogen gas, the A/C was heated on an oil bath to an inner temperature of 160° C. At this point of time, the pressure was 0.445 MPa (gauge pressure). When 10.67 g of TFE was fed into the autoclave, the pressure reached 0.89 MPa (gauge pressure), and it follows that the TFE partial pressure was 0.445 MPa at the polymerization temperature.

0.79 g of a 667 mass ppm initiator solution of tBPO in PSAE was added to initiate polymerization. That means that 0.53 mg of tPBO was added, and the tBPO concentration in the autoclave was 1.0 mass ppm of the initial feed of PSAE present in the autoclave before initiation of the polymerization. TFE was continuously added, while the pressure was maintained at 0.89 MPa (gauge pressure), and the polymerization was continued for 10 hours. During the polymerization, 0.66 g of the initiator solution (containing 0.44 mg of tBPO) was added every 30 minutes 19 times in total, and thus the total feed of tBPO into the autoclave was 8.34 mg. Namely, tBPO was added so as to return the tBPO concentration to 1.0 mass ppm of the initial feed of PSAE present in the autoclave before initiation of the polymerization, at each addition of tBPO. The above-mentioned operation means that the total feed of PSAE into the autoclave was 537.5 g, and total feed of tBPO was 8.87 mg. Therefore, the ratio of the total feed of tBPO to the total feed of PSAE was 1.6 mass ppm per 1 hour of polymerization (referred to as "hourly ratio of initiator" in the tables). The additional feed of TFE was 20.5 g. During the polymerization, the reaction solution was stirred with an anchor blade rotating at a rotational speed of 250 rpm.

The autoclave was cooled to an inner temperature of 30° C. or below, and the gas in the autoclave was purged. The polymer was precipitated by addition of 550 g (the same mass as PSAE) of HFE-347pc-f into the reaction solution, and the polymer was collected by filtration. The polymer was washed twice by stirring with the same amount of HFE-347pc-f, and dried under vacuum at 120° C. to obtain 42.7 g of polymer F-1, which is a copolymer of TFE and PSAE monomers. The Q value was 15.5 mm$^3$/sec, and the TQ value was 300° C. or above. The results are shown in Table 1-1.

Example 1-2

The procedure in Example 1-1 was followed except that some conditions were changed as shown in Table 1-1 to obtain Polymer F-2. The results are shown in Table 1-1.

Example 1-3

An autoclave (inner volume 2,500 mL, made of stainless steel) was evacuated, and 2,625.0 g of PSAE (monomer) was sucked into the autoclave. Dissolved oxygen was removed by repeating pressurization of the autoclave to 0.3 MPa (gauge) with nitrogen gas and pressure release to 0.05 MPa (gauge) 5 times. After introduction of nitrogen, the autoclave was heated on an oil bath to 160° C. At that point of time, the pressure was 1.02 MPa (gauge). When 46.9 g of TFE was fed into the autoclave, the pressure reached 1.36

MPa (gauge), and it follows that the TFE partial pressure was 0.34 MPa at the polymerization temperature.

4.38 g of a 300 mass ppm initiator solution of tBPO in PSAE was added to initiate copolymerization. That means that 1.31 mg of tPBO was added, and the tBPO concentration in the autoclave was 0.5 mass ppm of the initial feed of PSAE present in the autoclave before initiation of the copolymerization. TFE was continuously added, while the pressure was maintained at 1.36 MPa (gauge pressure), and the polymerization was continued for 8 hours. During the polymerization, the initiator solution was added continuously at a rate of 15.8 g/h (4.75 mg/h in terms of tBPO) for 7 hours so as to keep the tBPO concentration to 0.5 mass ppm of the initial feed of PSAE present in the autoclave before initiation of the polymerization. The above-mentioned operation means that the total feed of PSAE into the autoclave was 2,735.9 g, and total feed of tBPO was 34.6 mg. Therefore, the ratio of the total feed of tBPO to the total feed of PSAE was 1.6 mass ppm per 1 hour of polymerization. The additional feed of TFE was 63.1 g. During the polymerization, the reaction solution was stirred with a double helical blade rotating at a rotational speed of 150 rpm.

The autoclave was cooled to an inner temperature of 30° C. or below, and the gas in the autoclave was purged. The polymer was precipitated by addition of 5,288 g (1.9 times the mass of PSAE) of HFE-347pc-f into the reaction solution, and the polymer was collected by filtration. The polymer was washed twice by stirring with the same amount of HFE-347pc-f, and dried under vacuum at 120° C. to obtain 171.0 g of polymer F-3 which is a copolymer of TFE and PSAE monomers. The Q value was 15.8 mm$^3$/sec, and the TQ value was 300° C. or above. The results are shown in Table 1-1.

Examples 1-4 to 1-6

The procedure in Example 1-3 was followed except that some conditions were changed as shown in Table 1-1, and PFtBPO was used as the initiator in Example 1-5 to obtain polymer F-4 in Example 1-4, polymer F-5 in Example 1-5 and polymer F-6 in Example 1-6. The results are shown in Table 1-1.

Example 1-7

Polymer F'-1 was prepared in accordance with Example 1 in Japanese Patent No. 5217708.

87.96 g of PSAE (monomer) and 1.8 mg of tBPO as an initiator were put into a 125 mL stainless steel autoclave, cooled with liquid nitrogen and degassed sufficiently. Before initiation of the polymerization, the tBPO concentration was 20 mass ppm of the initial feed of PSAE present in the autoclave. After heating to 100° C., TFE was fed into the autoclave, while the pressure was kept at 0.39 MPaG, and then the pressure was raised to 0.72 MpaG by introduction of nitrogen gas and then to 0.95 MpaG by heating to 145° C. A 5.2 mass % initiator solution of tBPO in compound s-1 shown below was added sequentially every 30 minutes 12 times in total so that 0.67 mg of tBPO was added each time (because 0.67 mg of tBPO corresponds to 7.6 mass ppm of the initial feed of PSAE present in the autoclave present before initiation of the copolymerization, and the residual ratio of tBPO is about 68% after 30 minutes at 145° C., it follows that the tBPO concentration exceeded 7.6 mass ppm at each addition). 30 minutes after the 12th addition, the reaction was terminated by purging the gas in the autoclave and cooling the autoclave. The duration of stirring at 145° C. was 6.5 hours. The total feed of tBPO was 9.84 mg.

The product was diluted with compound s-1 and then the polymer was precipitated by addition of compound s-2 shown below, and polymer F'-1 was collected by filtration. Then, polymer F'-1 was stirred in compound s-1, precipitated again by addition of compound s-2 and dried under vacuum at 80° C. overnight. The yield was 10.8 g. The Q value was 423 mm$^3$/sec, and the TQ value was 217° C. The results are shown in Table 1-2.

$$CClF_2CF_2CHClF \qquad (s\text{-}1)$$

$$CH_3CCl_2F \qquad (s\text{-}2)$$

Example 1-8

Polymer F'-2 was prepared in accordance with Example 4 in Japanese Patent No. 5217708.

87.96 g of PSAE (monomer) and 0.9 mg of tBPO as an initiator were put into a 125 mL stainless steel autoclave, cooled with liquid nitrogen and degassed sufficiently. Before initiation of the polymerization, the tBPO concentration was 10 mass ppm of the initial feed of PSAE present in the autoclave. After heating to 100° C., TFE was fed into the autoclave, while the pressure was kept at 0.35 MPaG, and then the pressure was raised to 0.65 MPaG by introduction of nitrogen gas and then to 1.59 MPaG by heating to 170° C. A 5.2 mass % initiator solution of tBPO in compound s-1 was added sequentially every 30 minutes 12 times in total so that 0.33 mg of tBPO was added each time (because 0.33 mg of tBPO corresponds to 3.8 mass ppm of the initial feed of PSAE present in the autoclave present before initiation of the copolymerization, and the residual ratio of tBPO is about 1% after 30 minutes at 170° C., it follows that the tBPO concentration exceeded 3.8 mass ppm at each addition). 30 minutes after the 12th addition, the reaction was terminated by purging the gas in the autoclave and cooling the autoclave. The duration of stirring at 170° C. was 6.5 hours. The total feed of tBPO was 4.86 mg.

The product was diluted with compound s-1 and then the polymer was precipitated by addition of compound s-2 shown below, and polymer F'-2 was collected by filtration. Then, polymer F'-2 was stirred in compound s-1, precipitated again by addition of compound s-2 and dried under vacuum at 80° C. overnight. The yield was 3.5 g. The Q value was 232 mm$^3$/sec, and the TQ value was 240° C. The results are shown in Table 1-2.

Example 1-9

Polymer F'-3 was prepared in accordance with Example 1 in Japanese Patent No. 5862372.

A 2,575 mL stainless steel autoclave was evacuated, purged with nitrogen gas three times, and 1,959 g of PSAE (monomer) was sucked into the autoclave. After heating to 120° C., the total pressure was raised to 0.38 MPaG by introducing nitrogen gas and then to 0.84 MPaG by feeding 0.46 MPa of TFE.

3.91 g of a 5 mass % initiator solution of PFtBPO in PSAE was added to initiate copolymerization. That means that 195.50 mg of PFtBPO was added, and the PFtBPO concentration in the autoclave was 100.0 mass ppm of the initial feed of PSAE present in the autoclave before initiation of the copolymerization. While the pressure was maintained at 0.84 MPaG, the reaction was continued for 5 hours, and 2.41 g of the initiator solution was added sequentially every 1 hour 4 times (so that 120.5 mg of PFtBPO was added each time. Because 120.5 mg of PFtBPO corresponds to 61.5 mass ppm of the initial feed of PSAE present in the autoclave present before initiation of the copolymerization, and the residual ratio of PFtBPO is about 38% after 1 hour at 120° C., it follows that the PFtBPO concentration exceeded 61.5 mass ppm at each addition). 1 hour after the 4th addition, the reaction was terminated by cooling the autoclave and purging the gas in the autoclave. The total feed of PFtBPO was 677.50 mg.

The product was diluted with HFC-52-13p and then the polymer was precipitated by addition of HFE-347pc-f, and polymer F'-3 was collected by filtration. Then, polymer F'-3 was stirred in HFC-52-13p, precipitated again by addition of HFE-347pc-f dried under vacuum at 80° C. overnight. The yield was 323 g. The Q value was 55.6 mm$^3$/sec, and the TQ value was 295° C. The results are shown in Table 1-2.

Examples 1-10 and 1-11

The procedure in Example 1-1 was followed except that some conditions were changed as shown in Table 1-2, and the stirring during copolymerization was done with a double helical blade rotating at 250 rpm, to obtain polymer F'-4 in Example 1-10 and polymer F'-5 in Example 1-11. The results are shown in Table 1-2.

TABLE 1-1

|  | Ex. 1-1 | Ex. 1-2 | Ex. 1-3 |
|---|---|---|---|
| Reactor volume [ml] | 500 | 500 | 2500 |
| Species of monomer | PSAE | PSAE | PSAE |
| Initial feed of PSAE [g] before initiation of copolymerization | 525.0 | 525.0 | 2625.0 |
| Initial feed of TFE [g] before initiation of copolymerization | 10.67 | 12.13 | 46.9 |
| Copolymerization temperature [° C.] | 160 | 160 | 160 |
| TFE partial pressure [MPa] | 0.445 | 0.475 | 0.34 |
| Polymerization pressure [MPaG] | 0.89 | 0.88 | 1.36 |
| Species of initiator | tBPO | tBPO | tBPO |
| Concentration of initiator solution [ppm] | 667 | 500 | 300 |
| Initial feed [mg] of initiator in A/C at initiation of copolymerization | 0.53 | 0.39 | 1.31 |
| Initiator concentration [ppm] at initiation of copolymerization relative to initial feed of PSAE present in A/C before initiation of copolymerization | 1.0 | 0.75 | 0.5 |
| Mode of addition of initiator | seqeuntial addition 30 minute intervals | seqeuntial addition 30 minute intervals | continuous addition |
| Number of additions | 19 | 16 | — |
| Amount of initiator [mg] per addition | 0.44 | 0.33 | — |
| Initiator concentration [ppm] after addition relative to initial feed of PSAE present in A/C before initiation of copolymerization | 1.0 | 0.75 | — |
| Initiator feed rate [mg/h] during continuous addition | — | — | 4.75 |
| Initiator concentration [ppm] during continuous addition relative to initial feed of PSAE present in A/C before initiation of copolymerization | — | — | 0.50 |
| Copolymerization time [h] | 10.0 | 8.5 | 8.0 |
| Additional feed of TFE [g] | 20.5 | 19.2 | 63.1 |
| Total feed of TFE [g] | 31.2 | 31.3 | 110.0 |
| Total feed of PSAE [g] | 537.5 | 535.5 | 2735.9 |
| Total feed of initiator [mg] | 8.87 | 5.66 | 34.6 |
| Molar ratio of total feed of PSAE to total feed of TFE | 5.2 | 5.2 | 7.5 |
| Minimum initiator concentration [ppm] during copolymerization relative to initial feed of PSAE before initiation of coplymerization | 0.16 | 0.12 | 0.5 |
| Hourly ratio of initiator [ppm/h] | 1.6 | 1.2 | 1.6 |
| Species of polymer F or F' | F-1 | F-2 | F-3 |
| Polymer yield [g] | 42.7 | 40.1 | 171.0 |
| Rp (productivity index) [g/(100 g · h)] | 0.79 | 0.88 | 0.78 |
| PSAE units [mol %] | 29.6 | 28.0 | 29.3 |
| TFE units [mol %] | 70.4 | 72.0 | 70.7 |
| Q value [mm$^3$/sec] | 15.5 | 13.9 | 15.8 |
| TQ value [° C.] | 300≤ | 300≤ | 300≤ |

|  | Ex. 1-4 | Ex. 1-5 | Ex. 1-6 |
|---|---|---|---|
| Reactor volume [ml] | 2500 | 2500 | 10000 |
| Species of monomer | PSAE | PSAE | PSAE |
| Initial feed of PSAE [g] before initiation of copolymerization | 2625.0 | 2257.2 | 7606.0 |
| Initial feed of TFE [g] before initiation of copolymerization | 65.0 | 33.8 | 189.8 |
| Copolymerization temperature [° C.] | 160 | 160 | 160 |
| TFE partial pressure [MPa] | 0.44 | 0.31 | 0.39 |
| Polymerization pressure [MPaG] | 1.37 | 1.41 | 1.43 |
| Species of initiator | tBPO | PFtBPO | tBPO |
| Concentration of initiator solution [ppm] | 300 | 140 | 400 |
| Initial feed [mg] of initiator in A/C at initiation of copolymerization | 1.31 | 0.10 | 3.80 |
| Initiator concentration [ppm] at initiation of copolymerization relative to initial feed of PSAE present in A/C before initiation of copolymerization | 0.50 | 0.045 | 0.50 |
| Mode of addition of initiator | continuous addition | continuous addition | continuous addition |
| Number of additions | — | — | — |

TABLE 1-1-continued

| | | | |
|---|---|---|---|
| Amount of initiator [mg] per addition | — | — | — |
| Initiator concentration [ppm] after addition relative to initial feed of PSAE present in A/C before initiation of copolymerization | | | |
| Initiator feed rate [mg/h] during continuous addition | 4.75 | 6.45 | 13.76 |
| Initiator concentration [ppm] during continuous addition relative to initial feed of PSAE present in A/C before initiation of copolymerization | 0.50 | 0.045 | 0.50 |
| Copolymerization time [h] | 3.5 | 5.0 | 13.0 |
| Additional feed of TFE [g] | 72.4 | 21.8 | 457.0 |
| Total feed of TFE [g] | 137.4 | 55.6 | 646.8 |
| Total feed of PSAE [g] | 2680.4 | 2441.4 | 8053.1 |
| Total feed of initiator [mg] | 17.9 | 25.9 | 182.6 |
| Molar ratio of total feed of PSAE to total feed of TFE | 5.9 | 13.3 | 3.8 |
| Minimum initiator concentration [ppm] during copolymerization relative to initial feed of PSAE before initiation of coplymerization | 0.5 | 0.045 | 0.5 |
| Hourly ratio of initiator [ppm/h] | 1.9 | 2.1 | 1.7 |
| Species of polymer F or F' | F-4 | F-5 | F-6 |
| Polymer yield [g] | 149.0 | 63.6 | 900.7 |
| Rp (productivity index) [g/(100 g · h)] | 1.59 | 0.52 | 0.86 |
| PSAE units [mol %] | 24.6 | 30.7 | 26.4 |
| TFE units [mol %] | 75.4 | 69.3 | 73.6 |
| Q value [mm$^3$/sec] | 7.8 | 7.1 | 3.0 |
| TQ value [° C.] | 300≤ | 300≤ | 300≤ |

TABLE 1-2

| | Ex. 1-7 | Ex. 1-8 | Ex. 1-9 |
|---|---|---|---|
| Reactor volume [ml] | 125 | 125 | 2500 |
| Species of monomer | PSAE | PSAE | PSAE |
| Initial feed of PSAE [g] before initiation of copolymerization | 87.96 | 87.96 | 1959.0 |
| Initial feed of TFE [g] before initiation of copolymerization | — | — | — |
| Copolymerization temperature [° C.] | 145 | 170 | 120 |
| TFE partial pressure [MPa] | 0.39≤ | 0.35≤ | 0.46 |
| Polymerization pressure [MPaG] | 0.95 | 1.59 | 0.84 |
| Species of initiator | tBPO | tBPO | PFtBPO |
| Concentration of initiator solution [ppm] | 52000 | 52000 | 50000 |
| Initial feed [mg] of initiator in A/C at initiation of copolymerization | 1.8 | 0.9 | 195.5 |
| Initiator concentration [ppm] at initiation of copolymerization relative to initial feed of PSAE present in A/C before initiation of copolymerization | 20.0 | 10.0 | 100.0 |
| Mode of addition of initiator | seqeuntial addition 30 minute intervals | seqeuntial addition 30 minute intervals | seqeuntial addition 1 h intervals |
| Number of additions | 12 | 12 | 4 |
| Amount of initiator [mg] per addition | 0.67 | 0.33 | 120.5 |
| Initiator concentration [ppm] after addition relative to initial feed of PSAE present in A/C before initiation of copolymerization | 7.6≤ | 3.8≤ | 61.5≤ |
| Initiator feed rate [mg/h] during continuous addition | — | — | — |
| Initiator concentration [ppm] during continuous addition relative to initial feed of PSAE present in A/C before initiation of copolymerization | — | — | — |
| Copolymerization time [h] | 6.5 | 6.5 | 5.0 |
| Additional feed of TFE [g] | — | — | — |
| Total feed of TFE [g] | — | — | — |
| Total feed of PSAE [g] | 87.96 | 87.96 | 1972.4 |
| Total feed of initiator [mg] | 9.84 | 4.86 | 677.50 |
| Molar ratio of total feed of PSAE to total feed of TFE | — | — | — |
| Minimum initiator concentration [ppm] during copolymerization relative to initial feed of PSAE before initiation of coplymerization | 5.2≤ | 0.03≤ | 38.0≤ |
| Hourly ratio of initiator [ppm/h] | 17.2 | 8.5 | 68.7 |
| Species of polymer F or F' | F'-1 | F'-2 | F'-3 |
| Polymer yield [g] | 10.8 | 3.5 | 323 |
| Rp (productivity index) [g/(100 g · h)] | 1.89 | 0.61 | 3.28 |
| PSAE units [mol %] | 23.8 | 25.8 | 17.7 |
| TFE units [mol %] | 76.2 | 74.2 | 82.3 |
| Q value [mm$^3$/sec] | 423 | 232 | 55.6 |
| TQ value [° C.] | 217 | 240 | 295 |

TABLE 1-2-continued

|  | Ex. 1-10 | Ex. 1-11 |
|---|---|---|
| Reactor volume [ml] | 125 | 125 |
| Species of monomer | PSAE | PSAE |
| Initial feed of PSAE [g] before initiation of copolymerization | 140.0 | 140.0 |
| Initial feed of TFE [g] before initiation of copolymerization | 2.8 | 2.03 |
| Copolymerization temperature [° C.] | 160 | 160 |
| TFE partial pressure [MPa] | 0.33 | 0.24 |
| Polymerization pressure [MPaG] | 0.93 | 0.76 |
| Species of initiator | tBPO | tBPO |
| Concentration of initiator solution [ppm] | 1000 | 2000 |
| Initial feed [mg] of initiator in A/C at initiation of copolymerization | 0.4 | 0.70 |
| Initiator concentration [ppm] at initiation of copolymerization relative to initial feed of PSAE present in A/C before initiation of copolymerization | 3.0 | 5.0 |
| Mode of addition of initiator | seqeuntial addition 30 minute intervals | seqeuntial addition 30 minute intervals |
| Number of additions | 15 | 14 |
| Amount of initiator [mg] per addition | 0.35 | 0.59 |
| Initiator concentration [ppm] after addition relative to initial feed of PSAE present in A/C before initiation of copolymerization | 3.0 | 5.0 |
| Initiator feed rate [mg/h] during continuous addition | — | — |
| Initiator concentration [ppm] during continuous addition relative to initial feed of PSAE present in A/C before initiation of copolymerization | — | — |
| Copolymerization time [h] | 8.0 | 7.5 |
| Additional feed of TFE [g] | 5.16 | 3.58 |
| Total feed of TFE [g] | 8.0 | 5.6 |
| Total feed of PSAE [g] | 145.3 | 144.1 |
| Total feed of initiator [mg] | 5.69 | 8.90 |
| Molar ratio of total feed of PSAE to total feed of TFE | 5.5 | 7.8 |
| Minimum initiator concentration [ppm] during copolymerization relative to initial feed of PSAE before initiation of coplymerization | 0.49 | 0.82 |
| Hourly ratio of initiator [ppm/h] | 4.9 | 8.2 |
| Species of polymer F or F' | F'-4 | F'-5 |
| Polymer yield [g] | 11.8 | 10.6 |
| Rp (productivity index) [g/(100 g · h)] | 1.02 | 0.98 |
| PSAE units [mol %] | 30.1 | 33.7 |
| TFE units [mol %] | 69.9 | 66.3 |
| Q value [mm³/sec] | 60.5 | 934 |
| TQ value [° C.] | 285 | 199 |

The maximum initiator concentrations [mass ppm] relative to the initial feed of PSAE present before initiation of the copolymerization are shown in Table 2.

TABLE 2

|  | Ex. 1-1 | Ex. 1-2 | Ex. 1-3 | Ex. 1-4 | Ex. 1-5 | Ex. 1-6 |
|---|---|---|---|---|---|---|
| Maximum initiator concentration [mass ppm] relative to initial feed of PSAE before initiation of copolymerization | 1.0 | 0.75 | 0.5 | 0.5 | 0.045 | 0.5 |

|  | Ex. 1-7 | Ex. 1-8 | Ex. 1-9 | Ex. 1-10 | Ex. 1-11 |
|---|---|---|---|---|---|
| Maximum initiator concentration [mass ppm] relative to initial feed of PSAE before initiation of copolymerization | 20.0 | 10.0 | 100.0 | 3.0 | 5.0 |

[Production of Polymers H and Polymers H']

Polymers H-1 to H-6 and polymers H'-1 to H'-5 were prepared as described below.

Example 2-1

Polymer F-1 obtained as described above was press-molded under a pressure of 4 MPa (gauge) at a temperature higher by 10° C. than its TQ value or 260° C., whichever is the lower, into a membrane. The membrane of polymer F-1 was soaked in an aqueous alkaline solution (solution A: potassium hydroxide/water=20/80 (mass ratio)) at 80° C. for 16 hours to hydrolyze —SO₂F in polymer F-1 to —SO₃K. Then, the membrane was soaked in 3 mol/L aqueous hydrochloric acid at 50° C. for 30 minutes, then in ultrapure water at 80° C. for 30 minutes, and in 10 mass % aqueous hydrogen peroxide at 80° C. for 16 hours. The membrane was subjected to 5 cycles of soaking in aqueous hydrochloric acid and soaking in ultrapure water to convert —SO₃K in the polymer to —SO₃H. The membrane was washed with ultrapure water repeatedly until the pH of the ultrapure water immersing the membrane reached 7. The polymer membrane was sandwiched between filter papers and air-dried to obtain a membrane of polymer H-1. The results are shown in Table 3.

Examples 2-2 to 2-11

The procedure in Example 2-1 was followed except that polymers F-2 to F-6 and F'-1 to F'-5 were used instead of polymer F-1, and the aqueous alkaline solution was changed as shown in Table 3 to obtain polymers H-2 to H-6 in Examples 2-2 to 2-6 and polymers H'-1 to H'-5 in Examples 2-7 to 2-11. The results are shown in Table 3.

In Table 3, aqueous solution A is an aqueous solution containing potassium hydroxide and water in a mass ratio of 20/80, aqueous solution B is an aqueous solution containing potassium hydroxide, dimethyl sulfoxide and water in a mass ratio of 15/30/55, and aqueous solution C is an aqueous solution containing potassium hydroxide, methanol and water in a mass ratio of 15/20/65.

H-2 in the solvent mixture, liquid composition S-2, having a solid content of 22.1% and a viscosity of 285.2 mPas. The results are shown in Table 4.

Example 3-3

In an autoclave (inner volume 1 L, made of glass), 126.9 g of shredded polymer H-3 membrane and 394.0 g of a solvent mixture containing ethanol and water (50/50 (mass ratio)) were stirred under heating. After 6.5 hours of stirring at 105° C., the content was diluted with 5.0 g of ethanol and 106.0 g of water, then heated for 0.5 hour and allowed to cool. The content in the autoclave was filtered through a pressure filtration module (filter paper: PF040 manufactured by ADVANTEC Toyo Kaisha, Ltd.) to obtain 602.7 g of a dispersion of polymer H-3 in the solvent mixture, liquid composition S-3, having a solid content of 19.8% and a viscosity of 210.6 mPas. The results are shown in Table 4.

Example 3-4

The procedure in Example 3-2 was followed except that 24.7 g of polymer H-4, 80.1 g of a solvent mixture contain-

TABLE 3

|  | Ex. 2-1 | Ex. 2-2 | Ex. 2-3 | Ex. 2-4 | Ex. 2-5 | Ex. 2-6 |
|---|---|---|---|---|---|---|
| Polymer F/F' | F-1 | F-2 | F-3 | F-4 | F-5 | F-6 |
| Aqueous alkaline solution | solution A | solution A | solution A | solution A | solution A | solution A |
| polymer H/H' | H-1 | H-2 | H-3 | H-4 | H-5 | H-6 |
| Ion exchange capacity [meq/g dry resin] | 1.76 | 1.71 | 1.75 | 1.57 | 1.80 | 1.64 |

|  | Ex. 2-7 | Ex. 2-8 | Ex 2-9 | Ex. 2-10 | Ex. 2-11 |
|---|---|---|---|---|---|
| Polymer F/F' | F'-1 | F'-2 | F'-3 | F'-4 | F'-5 |
| Aqueous alkaline solution | solution C | solution A | solution B | solution A | solution A |
| polymer H/H' | H'-1 | H'-2 | H'-3 | H'-4 | H'-5 |
| Ion exchange capacity [meq/g dry resin] | 1.54 | 1.62 | 1.26 | 1.78 | 1.90 |

[Preparation of Liquid Compositions S and Liquid Compositions S']

Liquid compositions S-1 to S-6 and liquid compositions S'-1 to S'-5 were prepared as described below.

Example 3-1

In an autoclave (inner volume 200 mL, made of glass), 37 g of shredded polymer H-1 membrane and 147.9 g of a solvent mixture containing ethanol and water (50/50 (mass ratio)) were stirred under heating. After 4 hours of stirring at 110° C., the content was allowed to cool and filtered through a pressure filtration module (filter paper: PF040 manufactured by ADVANTEC Toyo Kaisha, Ltd.) to obtain 164.0 g of a dispersion of polymer H-1 in the solvent mixture, liquid composition S-1, having a solid content of 20.0%. The results are shown in Table 4.

Example 3-2

In an autoclave (inner volume 200 mL, made of glass), 37.5 g of shredded polymer H-2 membrane and 120.0 g of a solvent mixture containing ethanol and water (50/50 (mass ratio)) were stirred under heating. After 3 hours of stirring at 110° C., the content was diluted with 15.0 g of water, then heated for 2 hours and allowed to cool. The content in the autoclave was filtered through a pressure filtration module (filter paper: PF040 manufactured by ADVANTEC Toyo Kaisha, Ltd.) to obtain 161.3 g of a dispersion of polymer ing ethanol and water (50/50 (mass ratio)) and 22.5 g of diluent water was used, to obtain 122.9 g of liquid composition S-4 having a solid content of 19.2%. The results are shown in Table 4.

Example 3-5

The procedure in Example 3-3 was followed except that 20.1 g of polymer H-5, 57.2 g of a solvent mixture containing ethanol and water (50/50 (mass ratio)), 12.0 g of diluent ethanol and 16.9 g of diluent water were used to obtain 112.2 g of liquid composition S-5 having a solid content of 17.9%. The results are shown in Table 4.

Example 3-6

The procedure in Example 3-3 was followed except that 23.0 g of polymer H-6, 77.7 g of a solvent mixture containing ethanol and water (50/50 (mass ratio)), 17.6 g of diluent ethanol and 17.6 g of diluent water were used, to obtain 135.2 g of liquid composition S-6 having a solid content of 17.0%. The results are shown in Table 4.

Examples 3-7 to 3-11

The procedure in Example 3-1 was followed except that polymers H'-1 to H'-5 were used instead of polymer H-1 to obtain liquid compositions S'-1 to S'-5. The results are shown in Table 4.

TABLE 4

|  | Ex. 3-1 | Ex. 3-2 | Ex. 3-3 | Ex. 3-4 | Ex. 3-5 | Ex. 3-6 |
|---|---|---|---|---|---|---|
| Polymer H/H' | H-1 | H-2 | H-3 | H-4 | H-5 | H-6 |
| Liquid composition S/S' | S-1 | S-2 | S-3 | S-4 | S-5 | S-6 |
| Ethanol/water [mass ratio] | 50/50 | 44/56 | 38/62 | 39/61 | 60/40 | 50/50 |
| Solid content [%] | 20.0 | 22.1 | 19.8 | 19.2 | 17.9 | 17.0 |

|  | Ex. 3-7 | Ex. 3-8 | Ex. 3-9 | Ex. 3-10 | Ex. 3-11 |
|---|---|---|---|---|---|
| Polymer H/H' | H'-1 | H'-2 | H'-3 | H'-4 | H'-5 |
| Liquid composition S/S' | S'-1 | S'-2 | S'-3 | S'-4 | S'-5 |
| Ethanol/water [mass ratio] | 50/50 | 50/50 | 50/50 | 50/50 | 50/50 |
| Solid content [%] | 20.0 | 20.0 | 20.0 | 20.0 | 20.0 |

[Production of Polymer Electrolyte Membranes]

Polymer electrolyte membranes E-1 to E-6 and polymer electrolyte membranes E'-1 to E'-5 were prepared as described below.

Example 4-1

Liquid composition S-1 was applied onto a 100-μm ethylene-tetrafluoroethylene copolymer (ETFE) sheet with a die coater, then dried at 80° C. for 15 minutes to form a membrane, and treated with heat at 160° C. for 30 minutes to obtain polymer electrolyte membrane E-1, which is a membrane of polymer H-1 (thickness 25 μm). The results are shown in Table 5.

Examples 4-2 to 4-11

The procedure in Example 4-1 was followed except that liquid compositions S-2 to S-6 and liquid compositions S'-1 to S'-5 were used instead of liquid composition S-1 to obtain polymer electrolyte membranes E-2 to E-6 and polymer electrolyte membranes E'-1 to E'-5. The results are shown in Table 5.

A liquid composition (solid content 26.0 mass %, ethanol/water=60/40 (mass ratio)), which is a dispersion of a fluoropolymer containing acid-form sulfonic acid groups having an ion exchange capacity of 1.1 meq/g was prepared in accordance with Example 4 in JP-A-2018-55877. 20.0 g of a supported catalyst comprising 46 mass % platinum supported on carbon powder (product name: TEC10E50E manufactured by Tanaka Kikinzoku Kogyo) was mixed with 117 g of water and sonicated for 10 minutes to homogeneity. The resulting dispersion was mixed with 30.8 g of the liquid composition and 112 g of ethanol to obtain a catalyst layer coating liquid having a solid content of 10 mass %. The catalyst layer coating liquid was applied onto an ETFE sheet, dried at 80° C. and treated with heat at 160° C. for 30 minutes to obtain a catalyst layer (C-1) having a platinum content of 0.4 mg/cm$^2$.

A polymer electrolyte membrane obtained as described above was sandwiched between two catalyst layers and hot-pressed at 130° C. under 1.5 MPa for 5 minutes to bond the catalyst layers to both sides of the polymer electrolyte membrane, and the ETFE sheet was peeled off to obtain a membrane-catalyst layer assembly having an electrode area of 25 cm$^2$.

The membrane-catalyst layer assembly was sandwiched between two gas diffusion bases (product name: X0086 IX92 CX320 manufactured by NOK CORPORATION) having a carbon layer made of carbon and PTFE on one side so that the carbon layers came into contact with the catalyst layers in the membrane-catalyst layer assembly, to obtain a membrane-electrode assembly. The resulting membrane-electrode assembly was mounted in a power generation cell and assessed by the open circuit voltage test as previously described. The results are shown in Table 5. "Unmeasurable" indicates that the membrane was too swollen, dissolved or damaged to make measurements.

TABLE 5

|  | Ex. 4-1 | Ex. 4-2 | Ex. 4-3 | Ex. 4-4 | Ex. 4-5 | Ex. 4-6 |
|---|---|---|---|---|---|---|
| Liquid composition S/S' | S-1 | S-2 | S-3 | S-4 | S-5 | S-6 |
| Polymer electrolyte membrane E/E' | E-1 | E-2 | E-3 | E-4 | E-5 | E-6 |
| Water uptake [%] of polymer electrolyte membrane | 204 | 187 | 224 | 132 | 200 | 120 |
| Conductivity [S/cm] of polymer electrolyte membrane | 0.12 | 0.10 | 0.11 | 0.09 | 0.12 | 0.10 |
| Mass loss [%] of polymer electrolyte membrane (hot water resistance) | 5 | 2 | 6 | 0.5 | 0.8 | 0.5 |
| Chemical durability of polymer electrolyte membrane | ◯ | ◯ | ◯ | ◯ | ◯ | ◯ |

|  | Ex. 4-7 | Ex. 4-8 | Ex. 4-9 | Ex. 4-10 | Ex. 4-11 |
|---|---|---|---|---|---|
| Liquid composition S/S' | S'-1 | S'-2 | S'-3 | S'-4 | S'-5 |
| Polymer electrolyte membrane E/E' | E'-1 | E'-2 | E'-3 | E'-4 | E'-5 |
| Water uptake [%] of polymer electrolyte membrane | 400 | 360 | 50 | 313 | unmesurable |
| Conductivity [S/cm] of polymer electrolyte membrane | 0.08 | 0.09 | 0.06 | 0.12 | unmesurable |
| Mass loss [%] of polymer electrolyte membrane (hot water resistance) | 18 | 15 | 1 | 11 | 100 |
| Chemical durability of polymer electrolyte membrane | X | X | Δ | Δ | unmesurable |

As shown in Table 2, the maximum initiator concentration relative to the initial feed of PSAE was at most 2.5 mass ppm in Examples 1-1 to 1-6, whereas the maximum initiator concentration was 3.0 mass ppm or above in Examples 1-7 to 1-11 as comparative Examples. As shown in Table 5, it is demonstrated that from polymers F obtained as described above, polymer electrolyte membranes having not only higher conductivity and hot water resistance but also higher chemical durability were obtained than from polymers F'

Polymers H obtained by converting the fluorosulfonyl groups in polymers F having a Q value of from 0.2 to 60.0 mm$^3$/sec and comprising 21 to 59 mol % of PSAE units relative to all the constituting units to acid-form sulfonic acids were able to make polymer electrolyte membranes having not only high conductivity and hot water resistance but also high chemical durability.

[Evaluation of Performance as Catalyst Layer Polymer]

Catalyst layers C-2 and C-3 containing a polymer H and a polymer H' as a catalyst layer polymer were prepared as described below, and their power generation characteristics were evaluated.

Example 5-1

3.00 g of a supported catalyst comprising 46 mass % platinum supported on carbon powder (product name: TEC10E50E manufactured by Tanaka Kikinzoku Kogyo) was mixed with 19.2 g of water and sonicated for 10 minutes to homogeneity. The resulting dispersion was mixed with 6.14 g of liquid composition S-5 and then with 12.8 of ethanol to obtain a catalyst layer coating liquid having a solid content of 10 mass %. The catalyst layer coating liquid was applied onto an ETFE sheet, dried at 80° C. and treated with heat at 160° C. for 30 minutes to obtain catalyst layer C-2 having a platinum content of 0.4 mg/cm$^2$.

Example 5-2

The procedure in Example 5-1 is followed except that 20.0 g of water is used to disperse the platinum-based catalyst, and 5.56 g of liquid composition S'-4 and 12.6 g of ethanol are used, to obtain a catalyst layer coating liquid and catalyst layer C-3 having a platinum content of 0.4 mg/cm$^2$.

The procedure in Example 4-1 was followed except that a liquid composition comprising a fluoropolymer containing acid-form sulfonic acid groups having an ion exchange capacity of 1.1 meq/g in the form of a dispersion obtained in accordance with Example 4 of JP-A-2018-55877 was used instead of liquid composition S-1, to obtain a polymer electrolyte membrane having a thickness of 25 μm. The polymer electrolyte membrane is sandwiched by two catalyst layers (catalyst layers C-2 or catalyst layers C-3) and hot-pressed at 130° C. under 1.5 MPa for 5 minutes to bond the catalyst layers to both sides of the polymer electrolyte membrane, and the ETFE sheet is peeled off to obtain a membrane-catalyst layer assembly having an electrode area of 25 cm$^2$.

The membrane-electrode assembly is sandwiched between two gas diffusion bases (product name: X0086 IX92 CX320 manufactured by NOK CORPORATION) having a carbon layer made of carbon and PTFE on one side so that the carbon layers come into contact with the catalyst layers in the membrane-catalyst layer assembly, to obtain a membrane-electrode assembly. The resulting membrane-electrode assembly is mounted in a power generation cell, and its power generation characteristics are evaluated as described previously.

In the case of the membrane-electrode assembly comprising catalyst layers C-2, electricity is generated stably for more than 100 hours. In contrast, in the case of the membrane-electrode assembly comprising catalyst layers C-3, the output voltage decreases with time due to dissolution of the catalyst layer polymer into hot water being generated during power generation. Besides, flooding occurs due to excessive swelling of the catalyst layer polymer, and the output voltage is lower at a current density greater than 1.0 A/cm$^2$, as compared with the case of the membrane-electrode assembly comprising catalyst layers C-2.

Best Mode of the Invention

Example 6-1

To liquid composition S-1, cerium carbonate hydrate (Ce$_2$(CO$_3$)$_3$·8H$_2$O) was added so that the ratio of the total number of moles of the cerium atoms to the total number of moles of the sulfonic acid groups in the polymer H-1 was 0.0067, and stirred at 50° C. for 24 hours to obtain liquid composition L-1.

Liquid composition L-1 was coated onto a 100-μm ETFE sheet by a die coater, then dried at 80° C. for 15 minutes to form a membrane, and treated with heat at 185° C. for 30 minutes to obtain polymer electrolyte membrane E-10 having a thickness of 25 μm.

Example 6-2

To liquid composition S-1, cerium oxide is added so that the ratio of the total number of moles of the cerium atoms to the total number of moles of the sulfonic acid groups in the polymer H-1 is 0.033, and after adding zirconia beads having a diameter of 5 mm, the mixture is ground by using a planetary bead mill at a rotation speed of 300 rpm for 30 minutes, and the resulting dispersion is filtered through a 53 μm stainless mesh to obtain liquid composition L-2.

The procedure in Example 6-1 is followed except that the liquid composition was changed to obtain polymer electrolyte membrane E-11 having a thickness of 25 μm.

Example 6-3

Liquid composition L-1 is applied onto an ETFE sheet with a die coater, then immediately overlaid with a porous expanded PTFE film (thickness 10 μm, porosity 80%) to impregnate the porous expanded PTFE film with the liquid composition, dried in an oven at 80° C. for 15 minutes and treated with heat in an oven at 185° C. for 30 minutes to obtain polymer electrolyte membrane E-12 having a thickness of 15 μm.

Similarly, from liquid composition L-2, polymer electrolyte membrane E-13 having a thickness of 15 μm is obtained.

Example 6-4

The procedure in Example 6-1 is followed except that liquid composition S'-1 is used instead of liquid composition S-1 to obtain liquid composition L'-1. The procedure in Example 6-3 is followed except that the liquid composition is changed to liquid composition L'-1 to obtain polymer electrolyte membrane E'-10 having a thickness of 15 μm.

Example 7-1

A liquid composition comprising a fluoropolymer containing acid-form sulfonic acid groups having an ion exchange capacity of 1.1 meq/g in the form of a dispersion (solid content 26.0 mass %, ethanol/water=60/40 (mass ratio)) was obtained in accordance with Example 4 in JP-A-2018-55877.

44 g of a supported catalyst comprising 46 mass % platinum supported on carbon powder (product name: TEC10E50E manufactured by Tanaka Kikinzoku Kogyo) was mixed with 217.8 g of water and pulverized with an ultrasonic homogenizer to obtain a catalyst dispersion. To the catalyst dispersion, 117.4 g of a liquid mixture prepared by mixing and kneading 80.16 g of the liquid composition, 44.4 g of ethanol and 25.32 g of ZEORORA H (manufactured by Zeon Corporation) was added, and then 163.42 g and 139.12 g of ethanol were added. The resulting mixture was homogenized with an ultrasonic homogenizer and then adjusted to a solid content of 7 mass % to obtain a catalyst layer coating liquid.

The catalyst coating liquid was applied onto an ETFE sheet, dried at 80° C. and then treated with heat at 160° C. for 30 minutes to obtain catalyst layer C-4 having a platinum content of 0.1 mg/cm².

Example 7-2

133.16 g of compound m32-1, 32.67 g of compound m22-1 and 14.1 g of a solvent (ASAHIKLIN (registered trademark) AC-2000 manufactured by AGC Inc.) were put into a 230 mL stainless steel autoclave, cooled with liquid nitrogen and degassed sufficiently. 3.94 g of TFE (tetrafluoroethylene) was fed, and the temperature was raised to 24° C. 40.17 mg of a radical polymerization initiator ((C$_3$F$_7$COO)$_2$) was fed as a 2.8 mass % solution in compound s-1, and the feed line was washed with 1.1 g of AC-2000 to initiate the reaction. After 8 hours of stirring, the autoclave was cooled to terminate the reaction.

The product was diluted with AC-2000 and the polymer was precipitated by addition of a liquid mixture containing AC-2000 and methanol in a mass ratio of 8:2, and the polymer was collected by filtration. The polymer was washed in a liquid mixture containing AC-2000 and methanol in a mass ratio of 7:3 and collected by filtration. The filter cake was dried under vacuum overnight at 80° C. to obtain polymer p-1.

Polymer p-1 thus obtained was soaked in an aqueous solution containing 20 mass % methanol and 15 mass % potassium hydroxide at 50° C. for 40 hours to hydrolyze —SO$_2$F in polymer p-1 to —SO$_3$K. Then, the polymer was soaked in 3 mol/L aqueous hydrochloric acid at room temperature for 2 hours. The same treatment was repeated 4 more times with renewal of the aqueous hydrochloric acid, and polymer P-1 having sulfonic acid groups converted from —SO$_3$K groups. The ratios of respective species of units in polymer P-1 were determined by $^{19}$F-NMR, and polymer P-1 comprised 67 mol % of units based on monomer m22-1, 18 mol % of units based on monomer m32-1 and 15 mol % of units based on TFE. The TQ value of polymer p-1 was 275° C. The ion exchange capacity of polymer P-1 was found to be 1.23 meq/g dry resin.

Polymer P-1 and a solvent mixture of water and 1-propanol (water/1-propanol=50/50 (mass ratio)) were stirred in a hastelloy autoclave at 115° C. for 8 hours at a rotational speed of 150 rpm to obtain a 18 mass % dispersion of polymer P-1.

10 g of a supported catalyst comprising 46 mass % platinum supported on carbon powder (product name: TEC10E50E manufactured by Tanaka Kikinzoku Kogyo) was mixed with 49.5 g of ultrapure water and 40.5 g of ethanol and sonicated for 10 minutes to obtain a catalyst dispersion. The catalyst dispersion was mixed with 20.4 g of the dispersion of polymer P-1 so that the mass ratio of polymer P-1/carbon in the catalyst would be 0.8, and then diluted with 20.8 g of ultrapure water and 29.8 g of ethanol to a solid content of 8 mass % to obtain a catalyst layer coating liquid for cathode.

The catalyst layer coating liquid was applied onto an ETFE sheet, dried at 80° C. and treated with heat at 160° C. for 30 minutes to obtain catalyst layer C-5 having a platinum content of 0.1 mg/cm².

(m22-1)

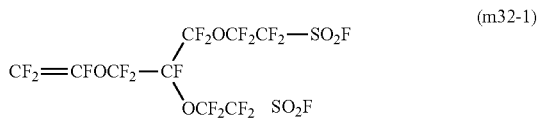
(m32-1)

Example 7-3

16.33 g of compound m22-1, 72.84 g of compound m32-1, 2.0 g of TFE (tetrafluoroethylene) and 54.0 mg of a radical polymerization initiator ((C$_3$F$_7$COO)$_2$) were put in a 125 mL stainless steel autoclave, cooled with liquid nitrogen and degassed sufficiently. Then, the temperature was raised to 24° C. and maintained 24° C. for 24 hours, and the autoclave was cooled to terminate the reaction.

The reaction product was worked up in the same manner as in Example 7-2 to obtain 26.0 of polymer p-2. It was subjected to the hydrolysis and subsequent steps in Example 7-2 to obtain polymer P-2 and catalyst layer C-6 comprising polymer P-2 having a platinum content of 0.1 mg/cm².

<Evaluation of Membrane-Electrode Assemblies (Examples 8-1 to Examples 8-11)>

Polymer electrolyte membranes E-1, E-10 to E-13, E'-1 and E'-10 are combined with catalyst layers C-4 to C-6, and an electrolyte membrane is sandwiched between two catalyst layers and hot-pressed at 130° C. under 1.5 MPa for 5 minutes to bond the catalyst layers to both sides of the polymer electrolyte membrane, and the ETFE sheet is peeled off to obtain a membrane-catalyst layer assembly having an electrode area of 25 cm².

The membrane-catalyst layer assembly is sandwiched between two gas diffusion bases (product name: X0086 IX92 CX320 manufactured by NOK CORPORATION) having a carbon layer made of carbon and PTFE on one side so that the carbon layers come into contact with the catalyst layers in the membrane-catalyst layer assembly, to obtain a membrane-electrode assembly. The resulting membrane-electrode assembly is mounted in a power generation cell, and the power generation characteristics, chemical durability and swelling-dehydration cycle durability are evaluated as described previously. The evaluated membrane-electrode assemblies are listed in Table 6.

TABLE 6

|  | Ex. 8-1 | Ex. 8-2 | Ex. 8-3 | Ex. 8-4 | Ex. 8-5 | Ex. 8-6 |
|---|---|---|---|---|---|---|
| Liquid composition used for preparation of polymer electrolyte membrane | S'-1 | S-1 | L-1 | L-2 | L-1 | L-2 |
| Polymer Electrolyte Membrane | E'-1 | E-1 | E-10 | E-11 | E-12 | E-13 |
| Durability enhancer | — | — | Ce ion | $CeO_2$ | Ce ion | $CeO_2$ |
| Reinforcement | — | — | — | — | reinforced | reinforced |
| Anode catalyst layer | C-4 | C-4 | C-4 | C-4 | C-4 | C-4 |
| Cathod catalyst layer | C-4 | C-4 | C-4 | C-4 | C-4 | C-4 |

|  | Ex. 8-7 | Ex. 8-8 | Ex. 8-9 | Ex. 8-10 | Ex. 8-11 |
|---|---|---|---|---|---|
| Liquid composition used for preparation of polymer electrolyte membrane | L-1 | L-2 | L-1 | L-2 | L'-1 |
| Polymer Electrolyte Membrane | E-12 | E-13 | E-12 | E-13 | E'-10 |
| Durability enhancer | Ce ion | $CeO_2$ | Ce ion | $CeO_2$ | Ce ion |
| Reinforcement | reinforced | reinforced | reinforced | reinforced | reinforced |
| Anode catalyst layer | C-4 | C-4 | C-4 | C-4 | C-4 |
| Cathod catalyst layer | C-5 | C-5 | C-6 | C-6 | C-6 |

The order of power generation characteristics among Example 8-1 to 8-11 is shown below.

Ex. 8-1<(Ex. 8-2 to 8-4)<Ex. 8-11<(Ex. 8-5 and Ex. 8-6)<(Ex. 8-7 and Ex. 8-8)<(Ex. 8-9 and Ex. 8-10)

The order of chemical durability among Example 8-1 to 8-11 is shown below.

Ex. 8-1<Ex. 8-2<Ex. 8-11<(Ex. 8-3 to 8-10)

The order of swelling-dehydration cycle durability among Example 8-1 to 8-11 is shown below.

Ex. 8-1<(Ex. 8-2 to Ex. 8-4)<Ex. 8-11<(Ex. 8-5 to Ex. 8-10)

The parentheses indicate that parenthesized Examples are of the same level.

Thus, a membrane-electrode assembly comprising the polymer electrolyte membrane of the present invention shows even better performance, when addition of cerium atoms, reinforcement of a thinner polymer electrolyte membrane with a reinforcing material and use of a catalyst layer made of an oxygen permeable polymer are satisfied in combination. In contrast, polymer electrolyte membranes according to prior art have poor proton conductivity. Though it is possible to improve their initial power generation characteristics by reducing membrane resistivity by making them thinner and reinforcing with a reinforcing material, because the electrolyte materials themselves are not resistant to hot water enough to resist dissolution during long operation, and membrane-electrode assemblies comprising these prior art polymer electrolyte membranes deteriorate in power generation characteristics faster than membrane-electrode assemblies comprising the polymer electrolyte membrane of the present invention. For the same reason, membrane-electrode assemblies comprising polymer electrolyte membranes according to prior art are poorer in swelling-dehydration cycle durability.

This application is a continuation of PCT Application No. PCT/JP2020/039549, filed on Oct. 21, 2020, which is based upon and claims the benefit of priority from Japanese Patent Application No. 2019-192095 filed on Oct. 21, 2019. The contents of those applications are incorporated herein by reference in their entireties.

REFERENCE SYMBOLS

10 membrane-electrode assembly
11 catalyst layer
12 gas diffusion layer
13 anode
14 cathode
15 polymer electrolyte membrane

What is claimed is:

1. A method for producing a fluoropolymer containing fluorosulfonyl groups, which comprises copolymerizing a monomer represented by the following formula m1 and tetrafluoroethylene in a reactor at a temperature of from 155 to 200° C. in the presence of a radical polymerization initiator to produce the fluoropolymer containing fluorosulfonyl groups, wherein the radical polymerization initiator is continuously or sequentially added into the reactor so that the concentration of the radical polymerization initiator is kept to at most 2.5 mass ppm of the initial feed of the monomer represented by the formula m1 present in the reactor before initiation of the copolymerization during the copolymerization, and a molar ratio of the total feed of the monomer represented by the formula m1 to the total feed of tetrafluoroethylene is from 1.5 to 20:

$$CF_2\!\!=\!\!CFCF_2O\text{-}Q^1\text{-}SO_2F \qquad (m1)$$

wherein $Q^1$ is a single bond or a perfluoroalkylene group which may have an ethereal oxygen atom.

2. A method for producing a fluoropolymer containing fluorosulfonyl groups, which comprises copolymerizing a monomer represented by the following formula m1 and tetrafluoroethylene in a reactor at a temperature of from 155 to 200° C. in the presence of a radical polymerization initiator to produce the fluoropolymer containing fluorosulfonyl groups, wherein a ratio of the total feed of the radical polymerization initiator into the reactor to the total feed of the monomer represented by the formula m1 into the reactor is from 0.01 to 4 mass ppm per 1 hour of copolymerization, and a molar ratio of the total feed of the monomer represented by the formula m1 to the total feed of tetrafluoroethylene is from 1.5 to 20:

$$CF_2\!\!=\!\!CFCF_2O\text{-}Q^1\text{-}SO_2F \qquad (m1)$$

wherein $Q^1$ is a single bond or a perfluoroalkylene group which may have an ethereal oxygen atom.

3. The method for producing a fluoropolymer containing fluorosulfonyl groups according to claim 1, wherein the monomer represented by the formula m1 is a monomer represented by the following formula m11:

$$CF_2\!\!=\!\!CFCF_2O(CF_2)_xSO_2F \qquad (m11)$$

wherein x is an integer of from 1 to 12.

4. The method for producing a fluoropolymer containing fluorosulfonyl groups according to claim 1, wherein the radical polymerization initiator is a bis(perfluoroalkyl) peroxide or a dialkyl peroxide.

5. A fluoropolymer containing fluorosulfonyl groups, which comprises units represented by the following formula f1 and units based on tetrafluoroethylene, wherein a Q value of the fluoropolymer containing fluorosulfonyl groups is from 0.2 to 55.0 mm³/s, and
   a ratio of units represented by the formula f1 to all the units constituting the fluoropolymer containing fluorosulfonyl groups is from 21 to 59 mol %,
   wherein the Q value is a volume (mm³/s) of the fluoropolymer extruded from a cylinder having a cross-sectional area of 1 cm² at a pressure of 2.94 MPa under a load of 30 kg at 260° C. through a nozzle having an inner diameter of 1 mm and a length of 1 mm during a unit time:

(f1)

wherein $Q^1$ is a single bond or a perfluoroalkylene group which may have an ethereal oxygen atom.

6. The fluoropolymer containing fluorosulfonyl groups according to claim 5, which converts into a fluoropolymer having acid-form sulfonic acid groups which has an ion exchange capacity of from 1.45 to 2.50 meq/g dry resin when the fluorosulfonyl groups are converted into acid-form sulfonic acid groups.

7. The fluoropolymer containing fluorosulfonyl groups according to claim 5, wherein the units represented by the formula f1 are units represented by the following formula f11:

(f11)

wherein x is an integer of from 1 to 12.

8. A method for producing a fluoropolymer containing sulfonic acid groups, which comprises converting the fluorosulfonyl groups in a fluoropolymer containing fluorosulfonyl groups produced by the method as defined in claim 1 into sulfonic acid groups.

9. A fluoropolymer containing sulfonic acid groups, which comprises units represented by the following formula u1 and units based on tetrafluoroethylene,
   wherein when the sulfonic acid groups in the fluoropolymer containing sulfonic acid groups are converted into fluorosulfonyl groups, a Q value of the resulting fluoropolymer containing fluorosulfonyl groups is from 0.2 to 55.0 mm³/s, and
   a ratio of units represented by the formula u1 to all the units constituting the fluoropolymer containing sulfonic acid groups is from 21 to 59 mol %,
   wherein the Q value is a volume (mm³/s) of the fluoropolymer extruded from a cylinder having a cross-sectional area of 1 cm² at a pressure of 2.94 MPa under a load of 30 kg at 260° C. through a nozzle having an inner diameter of 1 mm and a length of 1 mm during a unit time:

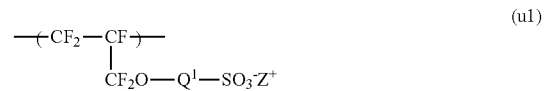
(u1)

wherein $Q^1$ is a single bond or a perfluoroalkylene group which may have an ethereal oxygen atom, and $Z^+$ is $H^+$, a metal ion or an ammonium ion.

10. The fluoropolymer containing sulfonic acid groups according to claim 9, wherein the sulfonic acid groups in the fluoropolymer containing sulfonic acid groups are acid-form sulfonic acid groups, and the fluoropolymer containing acid-form sulfonic acid groups has an ion exchange capacity of from 1.45 to 2.50 meq/g dry resin.

11. The fluoropolymer containing sulfonic acid groups according to claim 9, wherein the units represented by the formula u1 are units represented by the following formula u11,

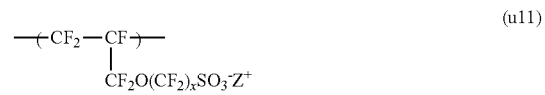
(u11)

wherein x is an integer of from 1 to 12, and $Z^+$ is $H^+$, a metal ion or an ammonium ion.

12. A liquid composition comprising the fluoropolymer containing sulfonic acid groups as defined in claim 9 and a liquid medium.

13. The liquid composition according to claim 12, which further comprises at least one member selected from the group consisting of cerium atoms and manganese atoms.

14. A polymer electrolyte membrane comprising the fluoropolymer containing sulfonic acid groups as defined in claim 9, wherein the sulfonic acid groups in the fluoropolymer containing sulfonic acid groups are acid-form sulfonic acid groups.

15. The polymer electrolyte membrane according to claim 14, which further comprises a reinforcing material.

16. The polymer electrolyte membrane according to claim 14, which has a thickness of from 5 to 200 μm.

17. The polymer electrolyte membrane according to claim 14, which further comprises at least one member selected from the group consisting of cerium atoms and manganese atoms.

18. A membrane-electrode assembly which comprises an anode having a catalyst layer comprising a catalyst and a polymer having ion exchange groups, a cathode having a catalyst layer comprising a catalyst and a polymer having ion exchange groups, and a polymer electrolyte membrane comprising a polymer having ion exchange groups disposed between the anode and the cathode,
   wherein at least one of the polymer having ion exchange groups in the anode, the polymer having ion exchange groups in the cathode and the polymer having ion exchange groups in the polymer electrolyte membrane is the fluoropolymer containing sulfonic acid groups as defined in claim 9.

19. A polymer electrolyte fuel cell comprising the membrane-electrode assembly as defined in claim 18.

* * * * *